United States Patent
Pedersen et al.

(10) Patent No.: US 7,133,865 B1
(45) Date of Patent: Nov. 7, 2006

(54) METHOD AND SYSTEMS FOR MAKING OLAP HIERARCHIES SUMMARISABLE

(76) Inventors: Torben Bach Pedersen, Arendalsvej 12, DK-8200 Århus N (DK); Christian S. Jensen, Risbjergvel 16, DK-9260 Gistrup (DK); Curtis E. Dyreson, 335 SE. Gladstone St., Apt. A., Pullman, WA (US) 99163

( * ) Notice: Subject to any disclaimer, the term of this patent is extended or adjusted under 35 U.S.C. 154(b) by 609 days.

(21) Appl. No.: 10/031,911

(22) PCT Filed: Jun. 30, 2000

(86) PCT No.: PCT/DK00/00354

§ 371 (c)(1),
(2), (4) Date: Apr. 19, 2002

(87) PCT Pub. No.: WO01/08041

PCT Pub. Date: Feb. 1, 2001

(30) Foreign Application Priority Data

Jul. 21, 1999 (DK) ............................... 1999 01045

(51) Int. Cl.
*G06F 7/00* (2006.01)
*G06F 17/00* (2006.01)
*G06F 17/30* (2006.01)

(52) U.S. Cl. ..................... 707/3; 707/4; 707/103
(58) Field of Classification Search ................ 707/3, 707/4, 6, 103
See application file for complete search history.

(56) References Cited

U.S. PATENT DOCUMENTS 5,918,232 A * 6/1999 Pouschine et al. ...... 707/103 R
6,535,872 B1 * 3/2003 Castelli et al. ................. 707/3
6,665,682 B1 * 12/2003 DeKimpe et al. ........... 707/101
2002/0077997 A1 * 6/2002 Colby et al. .................. 707/1
2002/0099691 A1 * 7/2002 Lore et al. ..................... 707/2

OTHER PUBLICATIONS

E. Baralis et al., "Materialized View Selection in a Multidimensional Database", Proceedins of the 23$^{rd}$ International Conference, pp. 156-165, 1997.
E.F. Codd et al., "Providing OLAP to User-Analysts: An It Mandate", Technical report, E.F. Codd & Associated, 1993.
D. Srivastava et al., "Answering Queries with Aggregation Using Views", In Proceedings of the Twenty-Second International Conference on VLDB, pp. 318-329, 1996.
P.M. Deshpande et al., "Cubing Algorithms, Storage Estimation, and Storage and Processing Alternatives for OLAP", IEEE Date Engineering Bulletin, 20(1):3-11. 1997.

(Continued)

*Primary Examiner*—Frantz Coby
*Assistant Examiner*—Cindy Nguyen
(74) *Attorney, Agent, or Firm*—Harness, Dickey & Pierce

(57) ABSTRACT

A method, a computer system and a computer program product for a computer system for transforming general On-line Analytical Processing (OLAP) hierarchies into summarizable hierarchies whereby pre-aggregation is disclosed, by which fast query response times for aggregation queries without excessive storage use is made possible even when the hierarchies originally are irregular. Pre-aggregation is essential for ensuring adequate response time during data analysis. Most OLAP systems adopt the practical pre-aggregation approach, as opposed to full pre-aggregation, of materializing only select combinations of aggregates and then re-use these for efficiently computing other aggregates. However, this re-use of aggregates is contingent on the dimension hierarchies and the relationships between facts and dimensions satisfying stringent constraints. The present invention significantly extends the scope of practical pre-aggregation by transforming irregulare dimension hierarchies and fact-dimension relationships into well-behaved structures that enable practical pre-aggregation.

23 Claims, 4 Drawing Sheets

OTHER PUBLICATIONS

V. Harinarayan, "Issues in Interactive Aggregation", IEEE Date Engineering Bulletin, 20(1):12-18, 1997.

C. Dyreson, "Using an Incomplete Data Cube as a Summary Data Sieve", IEEE Date Engineering Bulletin, 20(1):19-26.

T. Johnson et al., "Some Approaches to index Design for Cube Forests", IEEE Date Engineering Bulletin, 20(1):27-35.

S. Sarawagi, "Indexing OLAP Data", IEEE Date Engineering Bulletin, 20(1):36-43.

C.E. Dyreson, "Information Retrieval from an Incomplete Data Cube" Proceedings of the Twenty-Second Conference on VLDB, pp. 532-543, 1996.

J. Gray et al., "Data Cube: A Relational Aggregation Operator Generalizing Group-By, Cross-Tab, and Sub-Totals", Data Mining and Knowledge Discovery, 1(1):29-54, 1997.

A. Gupta et al., "Aggregate Query Processing in Data Warehousing Environments", Proceedings of the Twenty-First International Conference on VLDB, pp. 358-369, 1995.

H. Gupta et al., "Index Selection for OLAP", Proceedings of the Thirteenth international Conference on Date Engineering, pp. 208-219, 1997.

H. Gupta et al., "Selection of Views to Materialize in a Data Warehouse", Proceedings of the Sixth International Conference on Database Theory, pp. 98-112, 1997.

H. Gupta et al., "Selection of Views to Materialize Under a Maintenance Cost Constraint" Proceedings of the Seventh International Conference on Database Theory, pp. 453-470, 1999.

V. Harinarayan et al., "Implementing Data Cubes Efficiently", Proceedings of the ACM SIGMOND International Conference on the Management of Data, pp. 205-216, 1996.

Hyperion Corporation, "Hyperion Essbase OLAP Server", URL:<www.hyperion.com/downlaods/essbaseolap.pdf> Current as of Feb. 17, 1999.

Informix Corporation, "Data Warehouse Administrator's Guide: MetaCube ROLAP Option for Informix Dynamic Server", URL:<www.informix.com/answers/english/pdf_docs/metacube/4189.pdf>. Current as of Feb. 15, 1999.

R. Kimball, The Data Warehouse Toolkit, Wiley Computer Publishing, 1996. Chapter 1 pp. 1-19; Chapter 6 pp. 89-105; Chapter 7 p. 107 and Appendix D pp. 321-366.

R. Kimball, "Data Warehouse Architect: Help with Multi-Valued Dimension", DBMS Magazine, 11(9), 1998.

H. Lenz et al., "Summerizability in OLAP and Statistical Data Bases", Proceedings of the Ninth International Conference on Statistical and Scientific Database Management, pp. 39-48, 1997.

Microsoft Corporation, "OLE DB for OLAP" Version 1.0 Specification, Microsoft Technical Document 1998.

Microsoft Corporation, OLAP Services White Paper. URL:<www.microsott.com/sql/70/whpprs/olapoverview.htm> Current as of Feb. 9, 1999.

I.S. Mumick et al., "Maintenance of Data Cubes and Summary Tables in a Warehouse", Proceedings of the ACM SIGMOND International Conference on the Management of Data, pp. 100-111, 1997.

The OLAP Council, "MDAPI Specification Version 2.0" OLAP Council Technical Document, 1998.

The OLAP Report, "Database Explosion", URL:<www.olapreport.com/Databse-Explosion.htm> Current as of Feb. 10, 1999.

T.B. Pedersen et al., "Multidimensional Data Modeling for Complex Data" Proceedings of the Fifteenth International Conference on Data Engineering, 1999.

T.B. Pedersen et al., "Multidimensional Data Modeling for Complex Data" Proceedings of the Fifteenth International Conference on Data Engineering,. Extended version available as TimeCenter Technicla Report TR-37, URL:<www.cs.auc.dk/TimeCenter>, 1998.

T.B. Pedersen et al., "Extending Practical Pre-Aggregation in On-Line Analytical Processing", Proceedings of the $25^{th}$ VLDB Conference, pp. 663-674, 1999.

T.B. Pedersen et al., "Extending Practical Pre-Aggregation in On-Line Analytical Processing", Proceedings of the $25^{th}$ VLDB Conference, pp. 663-674,. Extended version available as TR R-99-5004, Dept. of Comp. Sci., Aalborg University, <www.cs.auc.dk/~tbp/articles/R995004.ps>, 1999.

D. Quass et al., "On-Line Warehouse View Maintenance", Proceedings of the ACM SIGMOND International Conference on the Management of Data, pp. 393-404, 1997.

M. Rafanelli et al., "STORM: A Statistical Object Representation Model" Proceedings of the Fifth International Conference on Statistical and Scientific Databases Management, pp. 14-29, 1990.

A. Segev et al., "Selective View Materialization in Data Warehousing Systems", Working Paper, URL:<ftp://segev.lbl.gov/pub/LBL_DB_PUBLICAITONS/1997/aggregdw.ps.> Current as of Feb. 9, 1999.

A. Shukla et al., "Storage Estimation for Multidimensional Aggregates in the Presence of Hierarchies", Proceedings of the Twenty-Second International Conference on VLDB, pp. 522-531, 1996.

D. Theodoratos et al., "Data Warehouse Configuration", Proceedings of the Twenty-Third International Conference on VLDB, pp. 126-135, 1997.

J. Widom, "Research Problems in Data Warehousing" Proceedings of the Fourth International Conference on Information and Knowledge Management, pp. 25-30, 1995.

R. Winter, "Database: Back in the OLAP game", Intelligent Enterprise Magazine, 1(4):60-64, 1998.

World Health Organization, "International Classification of Diseases (ICD-10). Tenth Revision", 1992.

J. Yang et al., "Algorithms for Materialized View Design in Data Warehousing Environment" Proceedings of the Twenty-Third International Conference on VLDB, pp. 136-145, 1997.

H.J. Lenz et al., "Summerizability in OLAP and Statistical Data bases", Scientific and Statistical Database Management, 1997. Proceedings, Ninth International Conference, pp. 132-143.

I.S. Mumick, "Maintenance for Data Cubes and Summary Tables in a Warehouse", AT&T Laboratories, 1997. URL:<http://citeseer.nj.nec.com/did/38362>.

* cited by examiner

METHOD AND SYSTEMS FOR MAKING OLAP HIERARCHIES SUMMARISABLE

FIELD OF THE INVENTION

The present invention relates to a method, a computer system, and a computer programme product for a computer system for transforming general On-line Analytical Processing (OLAP) hierarchies into summarisable hierarchies whereby pre-aggregation is enabled. Thereby, fast query response times for aggregation queries without excessive storage use are made possible even when the hierarchies originally are irregular.

BACKGROUND OF THE INVENTION

On-line Analytical Processing (OLAP) systems, which aim to ease the process of extracting useful information from large amounts of detailed transactional data, have gained widespread acceptance in traditional business applications as well as in new applications such as health care. These systems generally offer a dimensional view of data, in which measured values, termed facts, are characterised by descriptive values, drawn from a number of dimensions; and the values of dimension are typically organised in a containment-type hierarchy. A prototypical query applies an aggregate function, such as average, to the facts characterised by specific values from the dimensions.

Fast response times are required from these systems, even for queries that aggregate large amounts of data. The perhaps most central technique used for meeting this requirement is termed pre-aggregation, where the results of aggregate queries are pre-computed and stored, i.e., materialised, for later use during query processing. Pre-aggregation has attracted substantial attention in the research community, where it has been investigated how to optimally use pre-aggregated data for query optimisation [7,3] and how to maintain the pre-aggregated data when base data is updated [19, 24]. Further, the latest versions of commercial RDBMS products offer query optimisation based on pre-computed aggregates and automatic maintenance of the stored aggregate when base data is updated [30].

The fastest response times may be achieved when materialising aggregate results corresponding to all combinations of dimension values across all dimensions, termed full (or eager) pre-aggregation. However, the required storage space grows rapidly, to quickly become prohibitive, as the complexity of the application increases. This phenomenon is called data explosion [4, 21, 27] and occurs because the number of possible aggregation combinations grows rapidly when the number of dimensions increase, while the sparseness of the multidimensional space decreases in higher dimension levels, meaning that aggregates at higher levels take up nearly as much space as lower-level aggregates. In some commercial applications, full pre-aggregation takes up as much as 200 times the space of the raw data [21]. Another problem with full pre-aggregation is that it takes too long to update the materialised aggregates when base data changes.

With the goal of avoiding data explosion, research has focused on how to select the best subset of aggregation levels given space constraints [1, 9, 11, 26, 28, 32] or maintenance time constraints [10], or the best combination of aggregate data and indices [8]. This approach is commonly referred to as practical (or partial or semi-eager [5, 11, 29]) pre-aggregation. Commercial OLAP systems now also exist that employ practical pre-aggregation, e.g., Microsoft Decision Support Services (Plato) [18] and Informix MetaCube [13].

A new database operator that generalises aggregations for the N-dimensional data space is disclosed by Jim Gray et al. "*Data Cube: A Relational Aggregation Operator Generalizing group-By, Cross-Tab and Sub-Totals*", *Data Mining and Knowledge Discovery* 1, 1997, and solutions are proposed on how to integrate this operator on the execution and SQL-language level. It is mentioned that irregular dimension hierarchies renders the pre-aggregation impossible but no solution to this problem is provided.

The premise underlying the applicability of practical pre-aggregation is that lower-level aggregates can be re-used to compute higher-level aggregates, known as summarisability [16]. Summarisability occurs when the mappings in the dimension hierarchies are onto (all paths in the hierarchy have equal lengths), covering (only immediate parent and child values can be related), and strict (each child in a hierarchy has only one parent); and when also the relationships between facts and dimensions are many-to-one and facts are always mapped to the lowest levels in the dimensions [16]. However, the data encountered in many real-world applications fail to comply with this rigid regime. This motivates the search for techniques that allow practical pre-aggregation to be used for a wider range of applications, the focus of the present invention.

DESCRIPTION OF THE INVENTION

Motivated by the increasing use of OLAP systems in many different applications, including in business and health care, the present invention provides transformation techniques for multidimensional databases that leverage the existing, performance-enhancing technique, known as practical, or partial or semi-eager, pre-aggregation, by making this technique relevant to a much wider range of real-world applications.

Current pre-aggregation techniques assume that the dimensional structures are summarisable. Specifically, the mappings in dimension hierarchies must be onto, covering, and strict, the relationships between facts and dimensions must be many-to-one, and the facts must always be mapped to the lowest categories in dimensions.

The present invention presents novel transformation techniques that render dimensions with hierarchies that are non-onto, non-covering, and non-strict summarisable. The transformations have practically low computational complexity, they may be implemented using standard relational database technology, and it is also disclosed how to integrate the transformed hierarchies in current OLAP systems, transparently to the user.

The present description also disclose how to apply the transformations according to the invention to the cases of non-summarisable relationships between facts and dimensions, which also occur often in real-world applications. Finally, it is shown how to modify the algorithms to incrementally maintain the transformed hierarchies when the underlying data is modified. To our knowledge, this work is the first to present algorithms to automatically achieve summarisability for non-covering and non-onto hierarchies. The research reported here is also the first to demonstrate techniques and algorithms for achieving summarisability in non-strict hierarchies The integration of the techniques into current systems, transparently to the user, we believe is a novel feature.

The multidimensional databases or objects are, as the term indicates, comprised of a plurality of dimensions each being a hierarchy and the basic of the invention is to transform dimensions being irregular, that is being non-covering and/or non-onto and/or non-strict, into dimensions that are at least partly aggregation normalised, for most practical cases preferably fully aggregation normalised, to enable practical pre-aggregation of the dimensions. Thus, the present invention relates to a method for by means of a computer to at least partly aggregation normalise a dimension having dimension values organised into categories of dimension values based on a partial ordering, the dimension comprising mappings of links between dimension values, the method comprising the steps of retrieve the mapping from data storage means associated with the computer, analysing the mapping to determine irregularities of the dimension by means of analysing means executed by the computer, creating new dimension values of the dimension and modifying the mapping between dimensional values of the dimension according to the analysis, whereby the dimension is at least partly aggregation normalised, and saving the new dimension values and the modified mappings in data storage means of the computer.

Most important for a preferred embodiment of the present invention is to transform the dimension to a aggregation strict dimension, thus the step of creating new dimensional values and modifying the mapping preferably comprises the step of executing a make-strict procedure for making the dimension aggregation strict, thereby making the non-strict dimension aggregation normalised, the make-strict procedure being executed on the condition that the dimension is covering as well as onto prior to the execution.

The step of creating new dimensional values and modifying the mapping may further comprise the step of executing a make-onto procedure for making the dimension onto, thereby at least partly making an into dimension aggregation normalised, the make-onto procedure being executed on the condition that the dimension is covering prior to the execution. This step is included and executed if the method should be able to handle dimensions being non-onto.

Additionally or alternatively, the step of creating new dimensional values and modifying the mapping may comprise the step of executing a make-covering procedure for making the dimension covering, thereby at least partly making a non-covering dimension aggregation normalised. This step is included and executed if the method should be able to handle dimensions being non-covering.

The make-strict procedure comprises in a preferred embodiment of the invention the steps of, starting from the bottom category and successively proceeding towards the top category, identifying combinations of dimensional values of the same category for each of which combination at least one dimension value of a category below said category is linked to each of the dimension values of the combination, creating one or more new dimensional values each representing one of the identified combinations of dimensional values and creating links from the new dimensional values to dimensional values of above categories in accordance with existing links from each of the dimensional values represented by the new dimensional value, and identifying dimension values being linked to identified combinations of dimensional values of the same category and replacing the links with links to new dimensional values representing said combinations of dimensional values.

According to an even more preferred embodiment, the make-strict procedure comprises the successive steps of (i) setting the bottom category of the dimension as the child category, (ii) for each category being a direct predecessor of the child category of which category at least one dimension value of the child category is linked to a dimension value of, setting said category as the parent category and performing the steps of:

(iia) ending the make-strict procedure for the parent category in case the parent category is the top category of the dimension, (iib) ending the make-strict procedure for the parent category in case no dimension value of the parent category is linked to a dimension value of a higher category, (iic) creating a new fused category in the dimension immediately below the parent category in case at least one of the dimension values of the child category is linked to more than one dimension value of the parent category, (iid) for each dimensional value of the child category, performing the steps of: creating a new dimension value of the new fused category representing the one or more values of the parent category to which the dimensional value of the child category is linked and creating links from said new dimension value to said values in the parent category, the creation of the new dimension value being conditioned that no dimension value of the new fused category already exists having exactly such link(s), and for each category being a direct predecessor of the parent category of which category at least one dimension value of the parent category is linked to a dimension value of, setting said category as a grandparent category and creating links from the new dimension value to the one or more dimension values of the grandparent category to which said one or more dimensional values of the parent category are linked, (iie) removing the links from the parent category to the one or more grandparent categories, whereby the grandparent categories no longer are direct predecessors of the parent category, (iif) creating links from each dimensional value of the child category to the dimension value of the new fused category having the same links to the dimension values of the parent category whereby the new fused category becomes a direct predecessor of the child category, and removing the links from the dimension values of the child category to the parent category, whereby the parent category no longer is a direct predecessor of the child category, and (iig) setting the new fused category as the child category and returning to step (ii). This procedure is described as a recursive process but it is within the scope of the present invention to include a similar iterative procedure which would be obvious to the person skilled in the art.

The make-onto procedure comprises according to a preferred embodiment of the invention the steps of, starting from the to category and successively proceeding towards the bottom category, creating, for each dimension value of each category above the bottom category not being linked to any dimensional value of the category immediately below, a new dimension value in the category immediately below and creating a link between said new dimension value and said dimension value of the category in question.

According to an even more preferred embodiment, the make-onto procedure comprises the successive steps of (i) setting the top category of the dimension as the parent category, (ii) for each category immediately below the parent category and having dimension values being linked to dimension values of the parent category, setting said category as the child category and perform the steps of (iia) creating, for each dimension value of the parent category not being linked to any dimensional value of the child category, a new dimension value in the child category and creating a link between said new dimension value and said dimension value of the parent category, (iib) setting the child category as parent category, (iic) ending the make-onto procedure in case the parent category is the bottom category of the dimension, else returning to step (ii) of the make-onto procedure. As for the make-strict procedure, this procedure is described as a recursive process but it is within the scope of the present invention to include a similar iterative procedure which would be obvious to the person skilled in the art.

The make-covering procedure comprises according to a preferred embodiment of the present invention the successive steps of identifying links between dimension values of two categories having at least one intermediate category there between, creating a new dimension value in each of said intermediate categories for each of those links for which no paths of links exists going only through immediate child-parent links from lower to higher categories and including a link to a dimension value of the intermediate category, and replacing those links with links between the dimension values of those links and the new dimension values.

According to an even more preferred embodiment, the make-covering procedure comprises the successive steps of (i) setting the bottom category of the dimension as the child category, (ii) for each category immediately above the child category for which at least one link between a dimension value of said category and a dimension value of the child category exists, setting the category as the parent category and perform the steps of:

(iia) ending the make-covering procedure for the parent category in case the parent category is the top category of the dimension, (iib) for each higher category being a direct predecessor category of the child category and being higher in the hierarchy than the parent category, performing the steps of (iiba) identifying sets of dimension values of the higher category and dimension values of the child category for which sets a link exists, and no paths of links going only from lower to higher categories and including a link to a dimension value of the parent category exists, and (iibb) creating for each identified set of dimension values a new dimension value in the parent category, creating links between each of the dimension values of the set and the new dimension value, and removing the link between the two dimension values of the identified set, whereby the higher category no longer is a predecessor of the child category, (iic) setting the parent category as the child category and returning to step (ii).

As with the above described procedures, this procedure is also described as a recursive process but it is within the scope of the present invention to include a similar iterative procedure which would be obvious to the person skilled in the art.

The present invention further relates to a method for by means of a computer to at least partly aggregation normalise a multidimensional object including a set of facts comprising a plurality of facts mapped on a plurality of dimensions having dimension values organised into categories of dimension values based on a partial ordering, the multidimensional object comprising mappings of links between dimension values within each dimension, by means of applying the method according to previous description including the variations thereof to at least one of the dimensions of the multidimensional object. In order to handle multidimensional object comprising a plurality of facts and in which the mapping comprises links from each of the facts to at least one dimension value in each of the plurality of dimensions, the facts may be organised in the hierarchies of the dimensions so that they constitute the bottom layer of each of the dimensions of the multidimensional object where after the method is applied to the object.

According to a variation of the present invention which for may practical situations of pre-aggregation is preferred, one or more of the dimensions of the multidimensional object is only partly aggregation normalised, the performance of the partly aggregation normalisation being based on a selection of a subset of categories of the one or more dimension to be aggregation normalised. In particular, one or more of the dimensions of the multidimensional object may be only partly aggregation normalised in that the normalisation steps to be performed are selected by means of the computer based on a selection of specific aggregation functions to be performed on the multidimensional object.

The present invention relates in a yet further aspect and as an alternative to the above disclosed method of including the facts into the multidimensional object and perform the aggregation normalisation on the whole object, to a method for by means of a computer to at least partly aggregation normalise a multidimensional object including a set of facts comprising a plurality of facts mapped on an aggregation normalised plurality of dimensions having dimension values being organised into categories of dimension values based on a partial ordering, the multidimensional object comprising mappings of links between dimension values within each dimension, the method comprising the steps of retrieve the mapping from data storage means associated with the computer, including the mapping of the plurality of facts on the multidimensional object into the mapping of the multidimensional object so that the mapping comprises links from each of the facts to at least one dimension value in each of the plurality of dimensions, and the facts constitutes the bottom layer of each of the dimensions of the multidimensional object, analysing the mapping of the multidimensional object to determine irregularities of the dimensions by means of analysing means executed by the computer, creating new dimension values of the multidimensional object and modifying the mapping between dimensional values of the multidimensional object according to the analysis, whereby the multidimensional object is at least partly aggregation normalised, and saving the new dimensions and the modified mapping in data storage means of the computer.

In a preferred embodiment of the yet further aspect of the present invention, the step of creating new dimensional values and modifying the mapping comprises the step of executing a make-strict procedure for making the multidimensional object aggregation strict, thereby making the non-strict multidimensional object aggregation normalised, the make-strict procedure being executed on the condition that the multidimensional object is covering prior to the execution.

Additionally or alternatively, the step of creating new dimensional values and modifying the mapping comprises the step of executing a make-covering procedure for making the multidimensional object covering, thereby at least partly making the non-covering multidimensional object aggregation normalised.

The make-strict and make-covering procedures may within the scope of the present invention be constructed similarly to the above-described procedures with the necessary modifications which for the skilled person would be straight forward.

The method according to the yet further aspect may further comprise the initial step of making each of the plurality of dimensions aggregation normalised by means of the method described previously.

The created new dimensional values may be marked as such, e.g. be stored in a parallel new dimension or in another manner be recognisable by the computer as being new values, likewise may the changed mapping be made recognisable, where after a pre-aggregation is performed on a multidimensional object being normalised by means of the computer according to the method and the method may further comprise the step of producing a reply to a query made to the system and concerning the multidimensional object, aggregate queries as well as navigation queries, in which reply the existence of the created new dimensional values is transparent. Thereby, the method of the present invention may be added to existing methods of replying to queries to multidimensional objects thus making the existing methods capable of handling irregular multidimensional objects without changing the users access to make queries or the replies to the queries. Thus, it is hidden or transparent to the user or the computer programme making the queries that the original multidimensional object is irregular and not aggregation normal.

Multidimensional objects are often in practical use updated with new facts and it is preferred that the method is able to handle such updates, which may be very frequent, without the need to perform the above method on the entire original multidimensional object, which may be a very timely procedure. Thus, the method may further comprise the steps of implementing, into the aggregation normalised multidimensional object, of new facts including mapping of the facts onto the dimension, of new dimension values of the dimensions, or of new mapping between some of the dimension values, by which implementation irregularities of the multidimensional object is introduced, analysing the introduced irregularities of the dimensions of the multidimensional object, creating new dimensional values of the multidimensional object and modifying the mapping between dimensional values of the multidimensional object according to the analysis, whereby the multidimensional object is aggregation normalised, and saving the new dimensions and the modified mapping in data storage means of the computer.

The present invention relates further to a computer system comprising at least one general purpose computer having data storage means associated therewith on which data storage means is stored a computer programme product suitable for adapting the computer to perform an at least partly aggregation normalisation of a multidimensional object according to the above-described method(s), the computer system comprising means for retrieving the computer programme product and perform accordingly.

The present invention relates yet further to a computer programme product suitable for adapting a general purpose computer to perform an at least partly aggregation normalisation of a multidimensional object according to the above-described method(s).

A still further aspect of the present invention relates to a computer system having data storage means associated therewith on which a multidimensional object is stored, the multidimensional object including a set of facts comprising a plurality of facts, a first plurality of dimensions having dimension values being organised into categories of dimension values based on a partial ordering and comprising a first mapping of links between dimension values within each dimension of the first plurality of dimensions as well as links between the facts and the dimensions of the first plurality of dimensions, at least one of the dimensions of the first plurality of dimensions being irregular, and a second plurality of dimensions having dimension values being organised into categories of dimension values based on a partial ordering and comprising a second mapping of links between dimension values within each dimension of the second plurality of dimensions as well as links between the facts and the dimensions of the second plurality of dimensions, each of the second plurality of dimensions being aggregation normalised, the computer system comprising a query handler component being adapted for producing replies to queries made to the computer system and concerning the multidimensional object, the replies to navigation queries being based on the first set of dimensions and the replies to aggregate queries being based on the second set of dimensions. Thereby, the transparency to the user and the integratibility with known systems is in general achieved. Furthermore, a set of pre-aggregation data relating to the second plurality of dimensions may be stored within the data storage means and the replies to aggregate queries furthermore are based on the set of pre-aggregation data.

The query handler component may according to the computer system of the still further aspect be adapted for producing replies to aggregate queries in which replies the existence of the second plurality of dimensions is transparent. The query handler component may furthermore be adapted for transforming aggregate queries made to the first plurality of dimensions into queries for the second set of dimensions and transforming replies based on the second set of dimensions into replies as based on the first set of dimensions, thus making the existence of the second plurality of dimensions transparent in the produced reply. Additionally, the multidimensional object may be stored within the data storage means of the computer system in tables organised as a combination of star schemes for the part of the multidimensional object containing only strict mappings, and additional tables containing the non-strict part of the mappings, the query handler component makes use of said tables in transforming queries and replies.

The computer system according to the still further aspect of the present invention may suitably be combined with the above-described method(s) and comprise means adapted for performing an at least partly aggregation normalisation of a multidimensional object according to the method(s).

DESCRIPTION OF THE PREFERRED EMBODIMENT

The invention will be described primarily as a method for making non-summarisable hierarchies in multi-dimensional databases summarisable. However, a person skilled in the art will recognise that an apparatus, such as a data processing system, including a CPU, memory, I/O, program storage, a connecting bus, and other appropriate components, could be programmed or otherwise designed to facilitate the practice of the method of the invention. Such a system would include appropriate program means for executing the method of the invention.

Also, an article of manufacture, such as a pre-recorded disk or other similar computer program products, for use with a data processing system, could include a storage medium and program means recorded thereon for directing the data processing system to facilitate the practice of the method of the invention. Such apparatus and articles of manufacture also fall within the spirit of the invention.

BRIEF DESCRIPTION OF FIGURES

The detailed description of the invention is accompanied by a set of figures of which

DETAILED DESCRIPTION OF THE INVENTION

We now proceed to describe the invention in detail. The next section presents a real-world clinical case study that exemplifies the non-summarisable properties of real-world applications. The following section proceeds to define the aspects of a multidimensional data model necessary for describing the new techniques, and defines also important properties rated to summarisability. Algorithms are presented for transforming dimension hierarchies to achieve summarisability, then apply the algorithms to fix non-summarisable relationships between facts and dimensions. It is also demonstrated how the techniques may be integrated into current systems, transparently to the user and how to modify the algorithms to accommodate incremental computation.

Motivation—A Case Study

Figure 1:
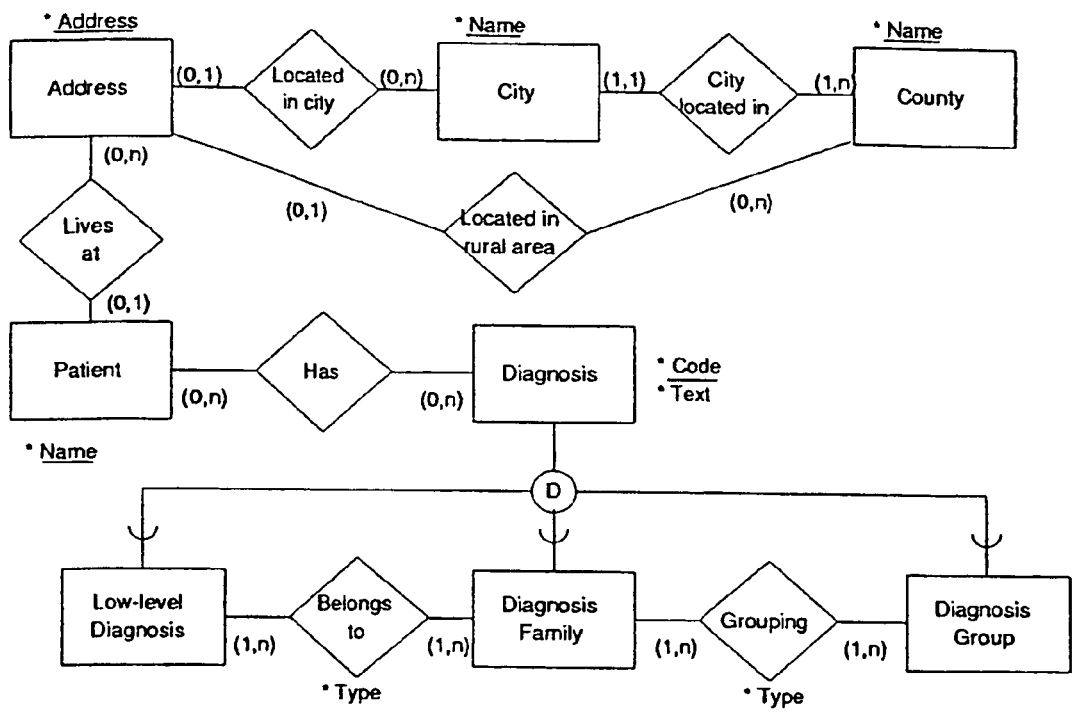
FIG. 1 is an ER diagram illustrating the underlying data of the case study.

This section presents a case study that illustrates the properties of real-world dimension hierarchies. The case study concerns patients in a hospital, their associated diagnoses, and their places of residence. The data analysis goal is to investigate whether some diagnoses occur more often in some areas than in others, in which case environmental or lifestyle factors might be contributing to the disease pattern. An ER diagram illustrating the underlying data is seen in FIG. 1.

The most important entities are the patients, for which we record the name. We always want to count the number of patients, grouped by some properties of the patients. Thus, in multidimensional terms, the patients are the facts, and the other, describing, entities constitute the dimensions.

Each patient has a number of diagnoses, leading to a many-to-many relationship between facts and the diagnosis dimension. When registering diagnoses of patients, physicians use different levels of granularity, ranging from very precise diagnoses, e.g., "Insulin dependent diabetes during pregnancy;" to more imprecise diagnoses, e.g., "Diabetes," which cover wider ranges of patient conditions. To model this, the relationship from patient to diagnoses is to the supertype "Diagnosis," which then has three subtypes, corresponding to different levels of granularity, the low-level diagnosis, the diagnosis family, and the diagnosis group. Examples of these are "Insulin dependent diabetes during pregnancy," "Insulin dependent diabetes," and "Diabetes," respectively. The higher-level diagnoses are both (imprecise) diagnoses in their own right, but also serve as groups of lower-level diagnoses.

Each diagnosis has an alphanumeric code and a descriptive text, which are specified by some standard, here the World Health Organisation's International Classification of Diseases (ICD-10) [31], or by the physicians themselves. Indeed, two hierarchies are captured: the standard hierarchy specified by the WHO, and the user-defined hierarchy, which is used for grouping diagnoses on an ad-hoc basis in other ways than given by the standard. The Type attribute on the relationships determines whether the relation between two entities is part of the standard or the user-defined hierarchy.

The hierarchy groups low-level diagnoses into diagnosis families, each of which consists of 2–20 related diagnoses.

For example, the diagnosis "Insulin dependent diabetes during pregnancy" (the reason for having a separate pregnancy related diagnosis is that diabetes must be monitored and controlled particularly intensely during a pregnancy to assure good health of both mother and child) is part of the family "Diabetes during pregnancy." In the WHO hierarchy, a low-level diagnosis belongs to exactly one diagnosis family, whereas the user-defined hierarchy does not have this restriction. Thus, a low-level diagnosis can belong to several diagnosis families, e.g., the "Insulin dependent diabetes during pregnancy" diagnosis belongs to both the "Diabetes during pregnancy" and the "Insulin dependent diabetes" family. Next, diagnosis families are grouped into diagnosis groups, consisting of 2–10 families, and one family may be part of several groups. For example, the family "Diabetes during pregnancy" may the part of the "Diabetes" and "Other pregnancy related diseases" groups.

In the WHO hierarchy, a family belongs to exactly one group. In the WHO hierarchy, a lower-level value belongs to exactly one higher-level value, making it strict and covering. In the user-defined hierarchy, a lower-level value may belong to zero or more higher-level values, making it non-strict and non-covering. Properties of the hierarchies will be discussed in more detail in the section "Hierarchy Properties."

We also record the addresses of the patients. If the address is located in a city, we record the city; otherwise, if the address is in a rural area, we record the county in which the address is located. A city is located in exactly one county. As not all addresses are in cities, we cannot find all addresses in a county by going through the "City located in" relationship. Thus, the mapping from addresses to cities is non-covering w.r.t. addresses. For cities and counties, we just record the name. Not all counties have cities in them, so the mapping from cities to counties is into rather than onto.

In order to exemplify the data, we assume a standard mapping of the ER diagram to relational tables, i.e., one table per entity and relationship type. We also assume the use of surrogate keys, named ID, with globally unique values. The three subtypes of the Diagnosis type are mapped to a common Diagnosis table, and because of this, the "belongs to" and "grouping" relationships are mapped to a common "Grouping" table. The resulting tables with sample data are shown in Table 1 and will be used in examples throughout the paper.

If we apply pre-aggregation to the data from the case study, several problems occur. For example, if the counts of patients by City are pre-computed and we use these for computing the numbers of patients by county, an incorrect result will occur. In the data, the addresses "123 Rural Road" and "1 Sandy Dunes" (one of them is the address of a patient) are not in any city, making the mapping from City to County not covering w.r.t. addresses.

Next, if the counts of patients by Low-Level Diagnosis are pre-computed and we use these for computing the total count of patients, an incorrect result again ensues. First, patients only with lung cancer are not counted, as lung cancer is not present at the level of Low-Level Diagnosis; the mapping from Low-Level Diagnosis to Diagnosis Family is into. Second, patients such as "Jim Doe" only have higher-level diagnoses and will no be counted; the fact-to-dimension mapping has varying granularity. Third, patients such as "Jane Doe" have several diagnoses and will be counted several times; the relationship between facts and dimensions

TABLE 1

Tables for the Case Study

| ID | Name |
|---|---|
| 1 | John Doe |
| 2 | Jane Doe |
| 3 | Jim Doe |

Patient

| PatientID | AddressID |
|---|---|
| 1 | 50 |
| 2 | 51 |
| 3 | 52 |

LivesAt

| ID | Address |
|---|---|
| 50 | 21 Central Street |
| 51 | 34 Main Street |
| 52 | 123 Rural Road |
| 53 | 1 Sandy Dunes |

Address

| ID | Name |
|---|---|
| 20 | Sydney |
| 21 | Melbourne |

City

| PatientID | DiagnosisID | Type |
|---|---|---|
| 1 | 9 | Primary |
| 2 | 5 | Secondary |
| 2 | 9 | Primary |
| 3 | 11 | Primary |

Has

| ParentID | ChildID | Type |
|---|---|---|
| 4 | 5 | WHO |
| 4 | 6 | WHO |
| 9 | 5 | User-defined |
| 10 | 6 | User-defined |
| 11 | 9 | WHO |
| 11 | 10 | WHO |
| 12 | 4 | WHO |
| 13 | 14 | WHO |

Grouping

| ID | Code | Text | Type |
|---|---|---|---|
| 4 | O24 | Diabetes during pregnancy | Family |
| 5 | O24.0 | Insulin dependent diabetes during pregnancy | Low-Level |
| 6 | O24.1 | Non insulin dependent diabetes during pregnancy | Low-Level |
| 9 | E10 | Insulin dependent diabetes | Family |
| 10 | E11 | Non insulin dependent diabetes | Family |
| 11 | E1 | Diabetes | Group |
| 12 | O2 | Other pregnancy related diseases | Group |
| 13 | A1 | Cancer | Group |
| 14 | A11 | Lung cancer | Family |

Diagnosis

| AddressID | CityID |
|---|---|
| 50 | 20 |
| 51 | 21 |

LocatedInCity

| ID | Name |
|---|---|
| 30 | Sydney |
| 31 | Melbourne |
| 32 | Outback |

County

TABLE 1-continued

Tables for the Case Study

| ID | Name |
|---|---|
| 52 | 31 |
| 53 | 32 |

LocatedInRuralArea

| CityID | CountyID |
|---|---|
| 20 | 30 |
| 21 | 31 |

CityLocatedIn is many-to-many. Fourth, Low-Level diagnoses such as "Insulin dependent diabetes during pregnancy" are part of several diagnosis families, which may also lead to "double" counting when computing higher-level counts; the dimension hierarchy is non-strict.

These problems yield "non-summarisable" dimension hierarchies that severely limit the applicability of practical pre-aggregation, leaving only full pre-aggregation, requiring huge amounts of storage, or no pre-aggregation, resulting in long response time for queries.

The properties described above are found in many other real-world applications. Many-to-many relationships between facts and dimensions occur between bank customers and accounts, between companies and Standard Industry Classifications (SICs), and between students and departments [15, 16]. Non-strict dimension hierarchies occur from cities to states in a Geography dimension [25] and from weeks to months in a Time dimension. In addition, hierarchies where the change over time is captured are generally non-strict. The mapping from holidays to weeks as well as organisation hierarchies of varying depth [12] offer examples of "into" mappings. Non-covering relationships exist for days-holidays-weeks and for counties-cities-states, as well as in organisation hierarchies [12].

Even though many real-world cases possess the properties described above, current techniques for practical pre-aggregation require that facts are in a many-to-one relationships to dimensions and that all hierarchies are strict, onto, and covering. Thus, current techniques cannot be applied when the hierarchies has these properties.

Method Context

This section defines the aspects of a multidimensional data model that are necessary to define the techniques that enable practical pre-aggregation in applications as the one just described. The full model is described elsewhere [22]. Next, the data model context is exploited for defining properties of hierarchies relevant to the techniques.

The particular data model has been chosen over other multidimensional data models because it quite naturally captures the data described in the case study and because it includes explicit concepts of dimensions and dimension hierarchies, which is very important for clearly presenting the techniques. However, the techniques are also applicable to other multidimensional or statistical data models, as will be discussed in the section "Architectural Conext."

A Concrete Data Model Context

For each part of the model, we define the intension and the extension, and we give an illustrating example.

An n-dimensional fact schema is a two-tuple $S=(F, D)$, where F is a fact type and $D=\{T_i, i=1, \ldots, n\}$ is its corresponding dimension types.

EXAMPLE 1

In the case study, Patient is the fact type, and Diagnosis, Residence, and Name are the dimension types. The intuition is that everything that characterises the fact type is considered to be dimensional.

A dimension type T is a four-tuple $(C, \leq_T, \leq T_T, \perp_T)$, where $C=\{C_j, j=1, \ldots, k\}$ are the category types of T, $\leq_T$ is a partial order on the $C_j$'s, with $T_T \in C$ and $\perp_T \in C$ being the top and bottom element of the ordering, respectively. Thus, the category types form a lattice. The intuition is that one category type is "greater than" another category type if members of the formers extension logically contain members of the latter's extension, i.e., they have a larger value size. The top element of the ordering corresponds to the largest possible value size, that is, there is only one value in it's extension, logically containing all other values.

We say that $C_j$ is a category type of T, written $C_j \in T$, if $C_j \in C$.

EXAMPLE 2

Figure 2:
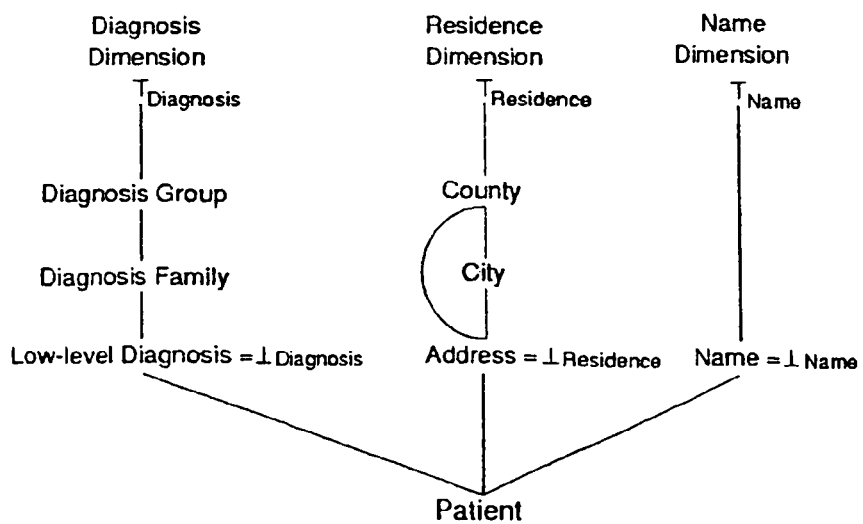
FIG. 2 illustrates the dimension types of the case study.

Low-level diagnoses are contained in diagnosis families, which are contained in diagnosis groups. Thus, the Diagnosis dimension type has the following order on its category types: $\perp_{Diagnosis}$=Low-level Diagnosis<Diagnosis Family<Diagnosis Group<$T_{Diagnosis}$. Other examples of category types are Address, City, and County. FIG. 2, to be discussed in detail later, illustrates the dimension types of the case study.

A category $C_j$ of type $C_j$ is a set of dimension values e. A dimension D of type $T=(\{C_j\}, \leq_T, T_T, \perp_T)$ is a two-tuple $D=(C, \leq)$, where $C=\{C_j\}$ is a set of categories $C_j$ such that Type($C_j$)=$C_j$ and $\leq$ is a partial order on $\cup_j C_j$, the union of all dimension values in the individual categories. We assume a function Pred: $C \mapsto 2^C$ that gives the set of direct predecessors of a category $C_j$. Similarly, we a assume a function Desc: $C \mapsto 2^C$ that gives the set of direct descendants of a category $C_j$. For both Pred and Desc, we "count" from the category $T_T$ (of type $T_T$), so that category $T_T$ has no predecessors and category $\perp_T$ (of type $\perp_T$) has no descendants. Similarly, we assume a function ImmPred: $C \mapsto 2^C$ that gives only the set of immediate predecessors of a category $C_j$. Immediate predecessors are immediately above in the hierarchy, i.e., City is an immediate predecessor of Address, but County is not. Similarly, we a assume a function ImmDesc: $C \mapsto 2^C$ that gives the set of immediate descendants of a category $C_j$.

The definition of the partial order is: given two values $e_1$, $e_2$ then $e_1 \leq e_2$ if $e_1$ is logically contained in $e_2$. We say that $C_j$ is a category of D, written $C_j \in D$, if $C_j \in C$. For a dimension value e, we say that e is a dimensional value of D, written $e \in D$, if $e \in \cup_j C_j$.

The category of type $\perp_T$ in dimension of type T contains the values with the smallest value size. The category with the largest value size, with type $T_T$, contains exactly one value, denoted T. For all values e of the dimension D, $e \leq T$. Value T is similar to the ALL construct of Gray et al. [6]. When the context is clear, we refer to a category of type $T_T$ as a T category, not to be confused with the T dimension value.

EXAMPLE 3

In our Diagnosis dimension we have the following categories, named by their type. The numbers in parentheses are the ID values from the Diagnosis table in Table 1.

Low-level Diagnosis={"Insulin dependent diabetes during pregnancy" (5), "Non insulin dependent diabetes during pregnancy" (6)}, Diagnosis Family={"Diabetes during pregnancy" (4), "Insulin dependent diabetes" (9), "Non insulin dependent diabetes" (10), "Lung cancer" (14)}, Diagnosis Group={"Diabetes" (11), "Other pregnancy related diseases" (12), "Cancer" (13)}, and $T_{Diagnosis}$={T}. We have that Pred(Low-level Diagnosis)={Diagnosis Family}. The partial order $\leq$ is obtained by combining WHO and user-defined hierarchies, as given by the Grouping table in Table 1. Additionally, the top value T is greater than, i.e., logically contains, all the other diagnosis values.

Let F be a set of facts, and D=(C={$C_j$}, $\leq$) a dimension. A fact-dimension relation between F and D is a set R {(f, e)}, where f∈F and e∈∪$_jC_j$. Thus R links facts to dimension values. We say that fact f is characterised by dimension value e, written f↝e, if $\exists e_1 \in D$ ((f, $e_1$) ∈R∧$e_1 \leq$e). We require that $\forall$f∈F ($\exists$e∈∪$_jC_j$ ((f, e)∈R)); thus, all fact maps to at least one dimension value in every dimension. The T value is used to represent an unknown or missing value, as T logically contains all dimension values, and so a fact f is mapped to T if it cannot be characterised within the particular dimension.

EXAMPLE 4

The fact-dimension relation R links patient facts to diagnosis dimension values as given by the Has table from the case study, so that R={("John Doe" (1), "Insulin dependent diabetes" (9)), ("Jane Doe" (2), "Insulin dependent diabetes during pregnancy" (5)), ("Jane Doe" (2), "Insulin dependent diabetes" (9)), ("Jim Doe" (3), "Diabetes" (11))}. Note that facts may be related to values in higher-level categories. We do not require that e belongs to $\perp_{Diagnosis}$. For example, the fact "John Doe" (1) is related to the diagnosis "Insulin dependent diabetes" (5), which belongs to the Diagnosis Family category. This feature will be used later to explicitly capture the different granularities in the data. If no diagnosis was known for patient "John Doe" (1), we would have added the pair ("John Doe" (1), T) to R.

A multidimensional object (MO) is a four-tuple M=(S, F, D, R), where S=(F, D={$T_i$}) is the fact schema, F={f} is a set of facts f where Type(f)=F, D={$D_i$, i=1, . . . , n} is a set of dimensions where Type($D_i$)=$T_i$, and R={$R_i$, i=1, . . . , n} is a set of fact-dimension relations, such that $\forall$i((f, e)∈$R_i \Rightarrow$ f∈F∧$\exists C_j \in D_i$(e∈$C_j$)).

EXAMPLE 5

For the case study, we get a three-dimensional MO M=(S, F, D, R), where S=(Patient, {Diagnosis, Name, Residence}) and F={"John Doe" (1), "Jane Doe" (2), "Jim Doe" (3)}. The definition of the diagnosis dimension and its corresponding fact-dimension relation was given in the previous examples. The Residence dimension has the categories Address ($\perp_{Residence}$), City, County, and $T_{Residence}$. The values of the categories are given by the corresponding tables in Table 1. The partial order is given by the relationship tables. Additionally, the only value in the $T_{Residence}$ category is T, which logically contains all the other values in the Residence dimension. The Name dimension is simple, i.e., it just has a Name category (=$\perp_{Name}$) and a T category. We will refer to this MO as the "Patient" MO. A graphical illustration of the schema of the "Patient" MO is seen in FIG. 2. Because some addresses map directly to counties, County is an immediate predecessor of Address.

The facts in an MO are objects with value-independent identity. We can test facts for equality, but do not assume an ordering on the facts. The combination of dimensions values that characterise the facts of a fact set is not a "key" for the fact set. Thus, several facts may be characterised by the same combination of dimension values. But, the facts of an MO is a set, so an MO does not have duplicate facts. The model formally defines quite general concepts of dimensions and dimension hierarchies, which is ideal for the presentation of our techniques. The presented techniques are not limited by the choice of data model.

Hierarchy Properties

In this section important properties of MOs that relate to the use of pre-computed aggregates are defined. The properties will be used in the following sections to state exactly what problems the proposed algorithms solve. The first important concept is summarisability, which intuitively means that higher-level aggregates may be obtained directly from lower-level aggregates.

Definition 1 Given a type T, a set S={$S_j$, j=1, . . . , k}, where $S_j \in 2^T$, and a function g: $2^T \mapsto$ T, we say that g is summarisable for S if g({{g($S_1$), . . . , g($S_k$)}})=g(S∪ . . . ∪$S_k$). The argument on the left-hand side of the equation is a multiset, i.e., the same value may occur multiple times.

Summarisability is important as it is a condition for the flexible use of pre-computed aggregates. Without summarisability, lower-level results generally cannot be directly combined into higher-level results. This means that we cannot choose to pre-compute only a relevant selection of the possible aggregates and then use these to (efficiently) compute higher-level aggregates on-the-fly. Instead, we have to pre-compute the all the aggregate results of queries that we need fast answers to, while other aggregates must be computed from the base data. Space and time constraints can be prohibitive for pre-computing all results, while computing aggregates from base data is often inefficient.

It has been shown that summarisability is equivalent to the aggregate function (g) being distributive, all paths being strict, and the mappings between dimension values in the hierarchies being covering and onto [16]. These concepts are formally defined below. The definitions assume a dimension D=(C, $\leq$) and an MO M=(S, F, D, R).

Definition 2 Given two categories, $C_1$, $C_2$ such that $C_2 \in$Pred($C_1$), we say that the mapping from $C_1$ to $C_2$ is onto iff $\forall e_2 \in C_2 (\exists e_1 \in C_1(e_1 \leq e_2))$. Otherwise, it is into. If all mappings in a dimension are onto, we say that the dimension hierarchy is onto. Given an MO M, if all dimension hierarchies in M are onto, we say that M is onto.

Mappings that are into typically occur when the dimension hierarchy has varying height. In the case study, there is no low-level cancer diagnosis, meaning that some parts of the hierarchy have height 2, while most have height 3. It is thus not possible to use aggregates at the Low-level Diagnosis level for computing aggregates at the two higher levels. Mappings that are into also occur often in organisation hierarchies.

Definition 3 Given three categories, $C_1$, $C_2$, and $C_3$ such that Type($C_1$)<Type($C_2$)<Type($C_3$), we say that the mapping from $C_2$ to $C_3$ is covering with respect to $C_1$ iff $\forall e_1 \in C_1(\forall e_3 \in C_3(e_1 \leq e_3 \Rightarrow \exists e_2 \in C_2(e_1 \leq e_2 \wedge e_2 \leq e_3)))$. Otherwise, it is non-covering with respect to $C_1$. If all mappings in a dimension are covering w.r.t. any category, we say that the dimension hierarchy is covering. If all dimension hierarchies in the dimensions of M are covering and all mappings between categories in the dimensions of M are covering w.r.t. F, we say that M is covering.

Non-covering mappings occur when some of the links between dimension values skip one or more levels and map directly to a value located higher up in the hierarchy. In the case study, this happens for the "1 Sandy Dunes" address, which maps directly to "Outback County" (there are no cities in Outback County). Thus, we cannot use aggregates at the City level for computing aggregates at the County level.

Definition 4 Given an MO $M=(S, F, D, R)$, and two categories $C_1$ and $C_2$ that belong to the same dimension $D_i \epsilon D$ such that $Type(C_1)<Type(C_2)$, we say that the mapping from $C_1$ to $C_2$ is covering with respect to F, the set of facts, iff $\forall f \epsilon F\ (\forall e_2 \epsilon C_2(f \leadsto_i e_2 \Rightarrow \exists e_1 \epsilon C_1(f \leadsto_i \wedge e_i \leq_i e_2)))$.

This case is similar to the one above, but now it is the mappings between facts and dimension values that may skip one or more levels and map facts directly to dimension values in categories above the bottom level. In the case study, the patients can map to diagnoses anywhere in the Diagnosis dimension, not just to Low-level Diagnoses. This means that we cannot use aggregates at the Low-level Diagnosis Level for computing aggregates higher up in the hierarchy.

Definition 5 Given two categories, $C_1$ and $C_2$ such that $C_2 \epsilon Pred(C_1)$, we say that the mapping from $C_1$ to $C_2$ is strict iff $\forall e_1 \epsilon C_1 (\forall e_2, e_3 \epsilon C_2(e_1 \leq e_2 \wedge e_1 \leq e_3 \Rightarrow e_2 = e_3))$. Otherwise, it is non-strict. The hierarchy in dimension D is strict if all mappings in it are strict; otherwise, it is non-strict Given an MO $M=(S, F, D, R)$ and a category $C_j$ in some dimension $D_i \epsilon D$, we say that there is a strict path from the set of facts F to $C_j$ iff $\forall f \epsilon F(f \leadsto_i e_1 \wedge f \leadsto_i e_2 \wedge e_1 \epsilon C_j \wedge e_2 \epsilon C_j \Rightarrow e_1 = e_2)$. (Note that the paths to the $T_T$ categories are always strict.) The hierarchy in dimension D is said to be aggregation strict if the following hold: if a mapping from a category C to a category P, both in D, is non-strict, then $Pred(P)=\emptyset$, i.e., P has no parents in the hierarchy.

Non-strict hierarchies occur when a dimension value has multiple parents. This occurs in the Diagnosis dimension in the case study where the "Insulin dependent diabetes during pregnancy" low-level diagnosis is part of both the "Insulin Dependent Diabetes" and the "Diabetes during pregnancy" diagnosis families, which in turn both are part of the "Diabetes" diagnosis group. This means that we cannot use aggregates at the Diagnosis Family level to compute aggregates at the Diagnosis Group level, since data for "Insulin dependent diabetes during pregnancy" would then be counted twice. Hierarchies that are aggregation strict allow practical pre-aggregation to be applied because the values in the parent category has no parents themselves. This means that double-counting of data will not occur, since the values in the parent categories containing possibly overlapping data will not be added together.

Definition 6 If the dimension hierarchy for a dimension D is onto, covering, and strict, we say that D is normalised. Otherwise, it is un-normalised. For an MO $M=(S, D, F, R)$, if all dimensions $D_i \epsilon D$ are normalised and $\forall R_i \epsilon R((f, e) \epsilon R_i \Rightarrow e \epsilon \bot_D)$ (i.e., all facts map to dimension values in the bottom category), we say that M is normalised. Otherwise, it is un-normalised. If the hierarchy in a dimension D is covering, onto, and aggregation strict, we say that D is aggregation normalised. If all dimensions in an MO M are aggregation normalised and the relationships from facts to dimensions are many-to-one and only to the bottom category, we say that M is aggregation normalised.

For normalised hierarchies and MOs, all mappings are summarisable, meaning that we can pre-aggregate values at any combination of dimension levels and safely re-use the pre-aggregated values to compute higher-level aggregate results. Thus, we want to normalise the dimension hierarchies and MOs for which we want to apply practical pre-aggregation.

We proceed to describe how the normalisation of the dimension hierarchies and MOs used for aggregation is achieved. We first show how to perform transformations on dimension hierarchies, then later describe how the same techniques may be applied to eliminate the non-summarisable properties of fact-dimension relations.

Dimension Transformation Techniques

This section describes how dimensions can be transformed to achieve summarisability. Transforming dimensions on their own, separately from the facts, results in well-behaved dimensions that can be applied in a number of different systems or sold to third-party users. The transformation of the dimension hierarchies is a three-step operation. First, all mappings are transformed to be covering, by introducing extra "intermediate" values. Second, all mappings are transformed to be onto, by introducing "placeholder" values at lower levels for values without any children. Third, mappings are made strict, by "fusing" values together. The three steps are treated in separate sections. None of the algorithms introduce any non-summarisable properties, so applying each once is sufficient.

In general, the algorithms take as input a set of tables $R_{C_1, C_2}$ that specifies the mapping from dimension values in category $C_1$ to values in category $C_2$. The input needs not contain all pairs of ancestors and descendants—only direct parent-child relationships are required. If there are non-covering mappings in the hierarchy, we have categories C, F, H such that $\{P, H\} \subseteq Pred(C)$ and $Type(P)<Type(H)$. In this case, the input must also contain $R_{P,H}$ tables that map P values to H values.

The algorithms are expressed using recursion. They could also easily be expressed using iteration instead.

Non-Covering Hierarchies

The first algorithm renders all mappings in a dimension hierarchy covering w.r.t. any category. When a dimension value is mapped directly to another value in a category higher than the one immediately above it in the hierarchy, a new intermediate value is inserted into the category immediately above, and the two original dimension values are linked to this new value, rather than to each other.

EXAMPLE 6

Figure 3:
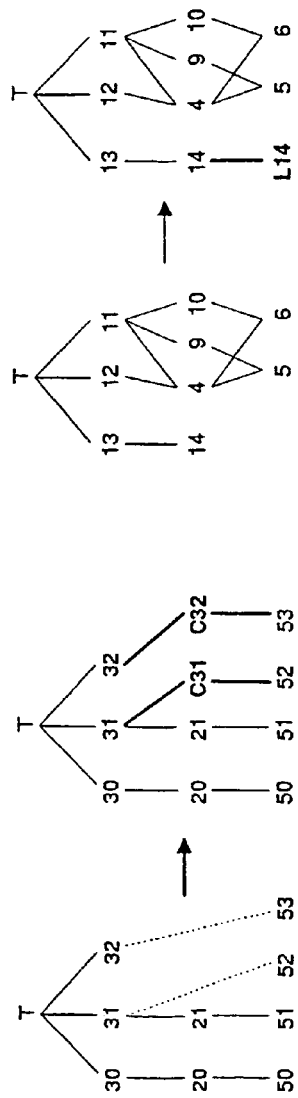
FIG. 3 illustrates on the left the transformation performed on the hierarchy by the Make Covering algorithm, and on the right the transformation performed on the hierarchy by the Make Onto algorithm.

In the hierarchy for the Residence dimension, two links go from Address directly to County. The address "123 Rural Road" (52) is in "Melbourne County" (31), but not in a city, and the address "1 Sandy Dunes" (53) is in "Outback County" (32), which does not have any cities at all. The algorithm inserts two new dimension values in the City category, C31 and C32, which represent Melbourne and Outback county, respectively, and links them to their respective counties. The addresses "123 Rural Road" and "1 Sandy Dunes" are then linked to C31 and C32, respectively. This occurs in the first call of procedure MakeCovering (on the Address category; the procedure is given below). When MakeCovering is called recursively on the City, County, and T categories, nothing happens, as all mappings are already covering. The transformation is illustrated graphically in FIG. 3 to the left. The dotted lines show the "problematic" links, and the bold-face values and thick lines show the new dimension values and links.

In the algorithm, C is a child category, P is an immediate parent category, H is a "higher" category, L are the non-covering links from C to H, and N are the "higher" dimension values in L. The ⋈ operator denotes natural join. The algorithm works as follows. Given the argument category C (initially the bottom category) in line (1), the algorithms goes through all C's immediate parent categories P (2). For each immediate parent category P, it looks for predecessor categories H of C that are "higher" in the hierarchy than P (4). If such an H exist, there might be links in the mapping from C to H that are not available by going through P. Line (6) finds these "non-covered" links, L, in the mapping from C to H by "subtracting" the links that are available by going through P from all the links in the mapping from C to H. Line (7) uses L to find the dimension values N in H that participate in the "non-covered" mappings. For each value in N, line (8) inserts a corresponding marked value into P; these marked values represent the N values in P. The marked values in P are then linked to the original values in H (9) and C (10). Line (12) changes the schema so that H is no longer a predecessor of C. This can be done safely as the intermediate values and links means that the values in H and C that were connected before are still connected by going through P. Line (13) contains a recursive call to the algorithm P, thus fixing mappings higher up in the hierarchy. The algorithm terminates when it reaches the T category, which has no predecessors.

```
(1)   procedure MakeCovering(C)
(2)     for each P ∈ ImmPred(C) do
(3)     begin
(4)       for each H ∈ Pred(C) where Type(H) > Type(P) do
(5)       begin
(6)         L ← R_{C,H} \ Π_{C,H}(R_{C,P} ⋈ R_{P,H})
(7)         N ← Π_H(L)
(8)         P ← P ∪ {Mark(h) | h ∈ N}
(9)         R_{P,H} ← R_{P,H} ∪ {(Mark(h), h) | h ∈ N}
(10)        R_{C,P} ← R_{C,P} ∪ {(c, Mark(h)) | (c, h) ∈ L}
(11)      end
(12)      Pred(C) ← Pred(C) \ {H}
(13)      MakeCovering(P)
(14)    end
(15)  end
```

All steps in the algorithm are expressed using standard relational algebra operators. The general worst-case complexity of join is $O(n^2)$, where n is the size of the input. However, because the input to the algorithm are hierarchy definitions, the complexity of the join in the algorithm will only be $O(n \log n)$. Thus, all the operators used can be evaluated in time $O(n \log n)$, where n is the size of the input. The Mark operation can be performed in $O(1)$ time. The inner loop of the algorithm is evaluated at most once for each link between categories, i.e., at most $k^2/2$ times, where k is the number af categories (if all categories are directly linked to all others). Thus, the overall big-O complexity of the algorithm is $O(k^2 n \log n)$, where k is the number of categories and n is the size of the largest participating $R_{C_1,C_2}$ relation. The worst-case complexity will not apply very often; in most cases, the inner loop will only be evaluated at most k times.

The algorithm inserts new values into the P category to ensure that the mappings from P to higher categories are summarisable, i.e., that pre-aggregated results for P can be directly combined into higher-level aggregate results. The new values in P mean that the cost of materialising aggregate results for P is higher for the transformed hierarchy than for the original. However, if the hierarchy was not transformed to achieve summarisability, we would have to materialise aggregates for G, and perhaps also for higher level categories. At most one new value is inserted into P for every value in G, meaning that the extra cost of materialising results for P is never greater than the cost of the (otherwise necessary) materialisation of results for G. This is a very unlikely worst-case scenario—in the most common cases, the extra cost for P will be much lower than the the cost of materialising results for G, and the savings will be even greater because materialisation of results for higher-level categories may also be avoided.

The correctness argument for the algorithm has two aspects. First, the mappings in the hierarchy should be covering upon termination. Second, the algorithm should only make transformations that are semantically correct, i.e., we should get the same results when computing results with the new hierarchy as with the old. The correctness follows from Theorem 1 and 2, below. As new values are inserted in the P category, we will get aggregate values for both the new and the original values when "grouping" by P. Results for the original values will be the same as before, so the original result set is a subset of the result set obtained with the transformed hierarchy.

Theorem 1 Algorithm MakeCovering terminates and the hierarchy for the resulting dimension D' is covering.

Proof: By induction in the height of the dimension lattice. Base: The height is 0, making the statement trivially true. Induction Step: We assume the statement is true for dimension lattices of height n, and consider lattices of height n+1. For termination, we note that there is a finite number of (P, H) pairs, all operations in the inner loop terminate, and the algorithm is called recursively on P, which is the root of a lattice of height n. For the covering property, we note that the insertion of intermediate, marked values into P means that the mapping from P to H is covering w.r.t. C. By the induction hypothesis, the mappings higher in the hierarchy are fixed by the recursive call of the algorithm.

Theorem 2 Given dimensions D and D' such that D' is the result of running MakeCovering on D, an aggregate result obtained using D is a subset of the result obtained using D'.

Proof: Follows easily from Lemma 1, next, as the inserted values are "internal" in the hierarchy.

Lemma 1 For the dimension D' (C', ≦') resulting from applying algorithm MakeCovering to dimension D (C, ≦), the following holds: $\forall e_1, e_2 \in D(e_1 \leq' e_2 \Leftrightarrow e_1 \leq e_2)$ (there is a path between any two original dimension values in the new dimension hierarchy iff there was a path between them in the original hierarchy).

Proof: By induction in the height of the dimension lattice. Base: The height is 0 making the statement trivially true. Induction Step: We assume the statement is true for dimension lattices of height n, and consider lattices of height n+1. Examing the inner loop, we see that the insertion of intermediate values into P, and the linking of values in C and H to these, only links values in C and H that were linked before. No links or values are destroyed by the inner loop. Thus, the statement is true for the links from C to P, and from C to H. By the induction hypothesis, the statement holds true for the transformations made by the recursive call on P.

We see that the original values in the hierarchy are still linked to exactly the same original values as before, as stated by Lemma 1, although new values might have been inserted in-between the original values. Thus, when evaluating a query using the transformed hierarchy, the results for the original values will be the same as when using the original hierarchy.

Assuming only the original result set is desired, results for the new values must be excluded, which is easy to accomplish. The new, "internal" values are marked with "mark=internal", whereas the original values have "mark=original". In order to exclude the new, internal values from the result set, the equivalent of an SQL HAVING clause condition of "mark=original" is introduced into the original query.

Non-Onto Hierarchies

The second algorithm renders all mappings in hierarchies onto, i.e., all dimension values in non-bottom categories have children. This is ensured by inserting placeholder values in lower categories to represent the childless values. These new values are marked with the original values, making it possible to map facts to the new placeholder values instead of to the original values. This makes it possible to only map facts to the bottom category.

EXAMPLE 7

In the Diagnosis dimension, the "Lung cancer" diagnosis family (ID=14) has no children. When the algorithm reaches the Diagnosis Family category, it inserts a placeholder value (L14) into the Low-level Diagnosis category, representing the "Lung cancer" diagnosis, and links it to the original value. Facts mapped to the "Lung cancer" value may then instead be mapped to the new placeholder value, ensuring that facts are mapped only to the Low-level Diagnosis Category. A graphical illustration of the transformation is seen to the right in FIG. 3. The bold-faced L14 value is the new value inserted; and the thick line between 14 and L14 is the new link inserted.

In the algorithm below, P is a parent category, C is a child category, and N holds the parent values with no children. The algorithm works as follows. Given a category P (initially the T category) in line (1), the algorithm goes through all categories C that are (immediate) descendants of P (2). For each C, line (4) finds the values N in P that have no children in C, by "subtracting" the values with children in C from the values in P. For each "childless" value in N, lines (5) and (6), respectively, insert into C a placeholder value marked with the parent value, and links the new value to the original. MakeOnto is then called recursively on C (7). The algorithms terminates when it reaches the ⊥ category, which has no descendants.

```
(1)     procedure MakeOnto(P)
(2)         for each C ∈ Desc(P) do
(3)         begin
(4)             N ← P \ Π_P(R_{C,P})
(5)             C ← C ∪ {Mark(p) | p ∈ N}
(6)             R_{C,P} ← R_{C,P} ∪ {(Mark(p),p) | p ∈ N}
(7)             MakeOnto(C)
(8)         end
(9)     end
```

Following the reasoning in the previous section, we find that the overall big-O complexity is $O(k^2 n \log n)$, where k is the number of categories and n is the size of the largest participating $R_{C_1,C_2}$ relation. However, the complexity will only be $O(kn \log n)$ for the most common cases.

The MakeOnto algorithm inserts new values into C to ensure that the mapping from C to P is summarisable. Again, this means that the cost of materialising results for C will be higher for the transformed hierarchy than for the original. However, if the new values were not inserted, we would have to materialise results for P, and perhaps also higher categories, as well as C. At most one value is inserted in C for every value in P, meaning that the extra cost for C is never greater than the cost of materialising results for P. As before, this is a very unrealistic scenario, as it corresponds to the case where no values in P have children in C. In most cases, the extra cost for C will be a small percentage of the cost of materialising results for P, and the potential savings will be even greater, because pre-aggregation for higher-level categories may be avoided.

As before, the correctness argument for the algorithm has two aspects. First, the mappings in the hierarchy should be onto upon termination. Second, the algorithm should only make transformations that are semantically correct. The correctness follows from Theorems 3 and 4, below. Again, the result set for the original values obtained using the original hierarchy will be a subset of the result set obtained using the transformed hierarchy. The results for the new values can be excluded from the result set by adding a HAVING clause condition.

Theorem 3 Algorithm MakeOnto terminates and the hierarchy for the resulting dimension D' is onto.

Proof: By induction in the height of the dimension lattice. Base: The height is 0, making the statement trivially true. Induction Step: We assume the statement is true for dimension lattices of height n, then consider lattices of height n+1. For termination, we note that there is a finite number of descendants C for each P, that all operations in the loop terminate, and that the algorithm is called recursively on C, which is the top element in a lattice of height n. For the onto property, we note that the insertion of placeholder values into C makes the mapping from C to P onto. By the induction hypothesis, the mappings further down in the lattice are handled by the recursive call.

Theorem 4 Given dimensions D and D' such that D' is the result of applying algorithm MakeOnto to D, an aggregate result obtained using D is a subset of the result obtained using D'.

Proof: Follows easily from the observation that "childless" dimension values are linked to new, placeholder values in lower categories in one-to-one relationships, meaning that data for childless values will still be counted exactly once in aggregate computations that use the new dimension.

Non-Strict Hierarchies

The third algorithm renders mappings in hierarchies strict, meaning that problems of "double-counting" will not occur. Non-strict hierarchies occur when one dimension value has several parent values.

The basic idea is to "fuse" a set of parent values into one "fused" value, then link the child value to this new value instead. The fused values are inserted into a new category in-between the child and parent categories. Data for the new fused category may safely be re-used for computation of higher-level aggregate results, as the hierarchy leading up to the new category is strict.

The fused value is also linked to the relevant parent values. This mapping is by nature non-strict, but this non-strictness is not a problem, as we prevent aggregate results for the parent category from being re-used higher up in the hierarchy. This is done by "unlinking" the parent category from its predecessor categories.

The categories higher up are instead reached through the fused category. This means that we can still get results for any original category, while being able to apply practical pre-aggregation throughout the hierarchy. In pre-aggregation terms, the "unlinking" of the parent categories means that we must prevent results for including this category from being materialised—only "safe" categories may be materialised. This should be given as a constraint to the pre-aggregation system that chooses which levels of aggregation to materialise.

We note that the algorithm does not introduce more levels in the hierarchy, only more categories, and that the number of "safe" categories in the result is the same as the number of original categories. This means that the complexity of the task of selecting the optimal aggregation levels to materialise is unaffected by the algorithm.

EXAMPLE 8

Figure 4:
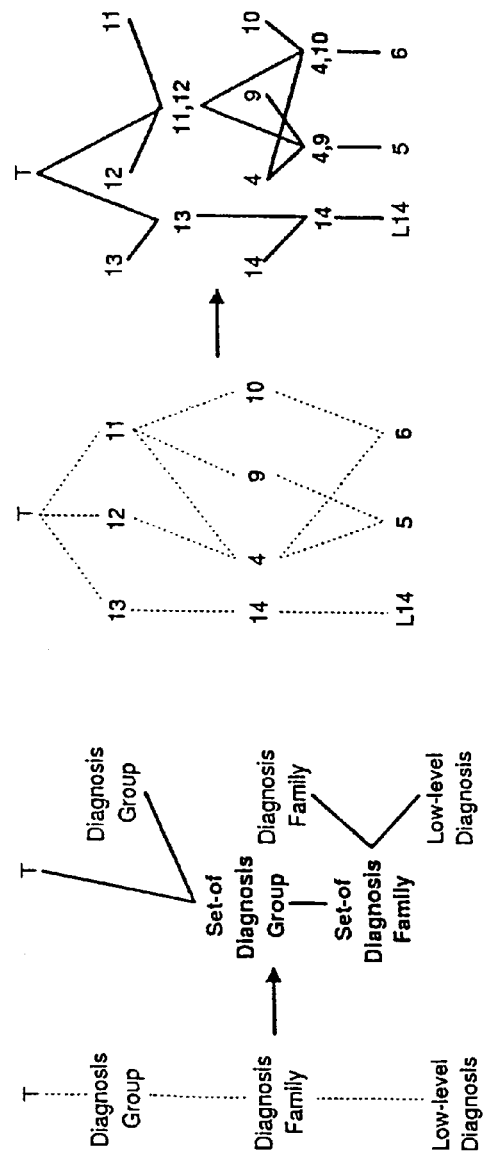
FIG. 4 illustrates the transformation performed on the hierarchy by the Make Strict algorithm.

The result of running the algorithm on the Diagnosis dimension is seen in FIG. 4. Because of the non-strictness in the mapping from Low-level Diagnosis to Diagnosis Family, and from Diagnosis Family to Diagnosis Group, two new category types and the corresponding categories are introduced. The third picture indicates the argument to the algorithm; and, in addition, its dotted lines indicate the links deleted by the algorithm. The fourth picture gives the result of applying the algorithm; here, the bold-face values and thick lines indicate the values and links inserted by the algorithm.

In the first call of the algorithm the three Low-level Diagnosis values—"(low-level) Lung cancer" (L14); "Insulin dependent diabetes during pregnancy" (5); and "Non insulin dependent diabetes during pregnancy" (6)—are linked to the three new fused values—"(low-level) Lung cancer" (14); "Diabetes during pregnancy, Insulin dependent diabetes" (4, 9); and "Diabetes during pregnancy. Non insulin dependent diabetes" (4, 10)—and these are in turn linked to "Lung Cancer" (14); "Diabetes during pregnancy" (4); "Insulin dependent diabetes" (9); and "Non insulin dependent diabetes" (10). The these latter four values in the Diagnosis Family category are un-linked from their parents, as the Diagnosis Family category is "unsafe."

When called recursively on the Set-of Diagnosis Family category, the algorithm creates the new fused values "Cancer" (13) and "Diabetes, Other pregnancy related diseases" (11, 12) in the Set-of Diagnosis Group category. These new values are linked to the values "Cancer" (13). "Diabetes" (11), and "Other pregnancy related diseases" (12) in the Diagnosis Group category, and to the T value; and the values in the Diagnosis Group category are un-linked from their parents. Note the Importance of having a T value: the values not linked to T are exactly the unsafe values, for which aggregate results should not be re-used.

The algorithm assumes that all paths in the dimension hierarchy have equal length, i.e., all direct links are from children to their immediate parents. This is ensured by the MakeCovering and MakeOnto algorithms. In the algorithm below, C is a child category, P is a parent category, G is a grandparent category, N is the new category introduced to hold the "fused" values, and ⋈ denotes natural join.

The algorithm takes a category C (initially the ⊥ category) as input. I then goes through the set of immediate parent categories P of C (line (2)). Line (4) tests if there is non-strictness in the mapping from C to P and if P has any parents (4). If this test fails, there is no problem as aggregate results for P can either be safely re-used or are guaranteed not be re-used; and the algorithm in then invoked recursively, in line (20).

It the test succeeds, the algorithm creates a new fused category. First, a new, empty category N with domain $2^P$ is created in line (6). The values inserted into this category represent sets of values of P. For example, the value "1, 2" represents the set consisting of precisely 1, 2. Values in C are then linked to to new, fused values, representing their particular combination of parents in P (7). The new values are constructed using a Fuse function, that creates a distinct value for each combination of P values and stores the corresponding P values along with it.

The resulting links are used in line (8) to insert the fused values into their category N, and an "Unfuse" function, mapping fused values from N into the corresponding P values, is used in line (9) to map the values in N to those in P. In line (10), N is included in, and P is excluded from, the sets of predecessors of C. The set of predecessors of N is set to P in line (11), meaning that the new category N resides in-between C and P in the hierarchy.

```
(1)  procedure MakeStrict (C)
(2)      for each P ∈ Pred(C) do
(3)      begin
(4)          if(∃e₁ ∈ C(∃e₂,e₃ ∈ P (e₁ ≦ e₂ ∧ e₁ ≦ e₃ ∧ e₂ ≠ e₃))}
                 ∧ Pred(P) ≠ ∅ then
(5)          begin
(6)              N ← CreateCategory(2^P)
(7)              R_{C,N} ← {(e₁, Fuse({e₂ | (e₁, e₂) ∈ R_{C,P}}))}
(8)              N ← Π_N(R_{C,N})
(9)              R_{N,P} ← {(e₁, e₂) | e₁ ∈ N ∧ e₂ ∈ Unfuse(e₁)}
(10)             Pred(C) ← Pred(C) ∪ {N} \ {P}
(11)             Pred(N) ← {P}
(12)             for each G ∈ Pred(P) do
(13)             begin
(14)                 R_{N,G} ← Π_{N,G}(R_{N,P} ⋈ R_{P,G})
(15)                 Pred(N) ← Pred(N) ∪ {G}
(16)                 Pred(P) ← Pred(P) \ {G}
(17)             end
(18)             MakeStrict(N)
(19)         end
(20)         else MakeStrict(P)
(21)     end
(22)  end
```

For each grandparent category G, the algorithm links values in N to values in G, in line (14), includes G in the predecessors of N, in line (15), and excludes G from the predecessors of P, in line (16), thereby also deleting the links from P to G from the hierarchy. The exclusion of the G categories from the predecessors of P means that aggregate results for P will not be re-used to compute results for the G categories.

In the end, the algorithm is called recursively on the new category, N. Note that the test for Pred(P)≠∅ in line (4) ensures that the mapping from N to P will not be altered, as P now has no predecessors.

Following the reasoning in the previous sections, we find that the overall big-o complexity is O(pnk log n log k), where p is the number of immediate parent and children categories in the dimension type lattice, n is the size of the largest mapping in the hierarchy, and k is the maximum number of values fused together. For most realistic scenarios, p and k are small constants, yielding a low O(n log n) complexity for the algorithm.

The MakeStrict algorithm constructs a new category N and insert fused values in N to achieve summarisability for the mapping from N to P, and from N to G. The algorithm only inserts the fused values for the combinations that are actually present in the mapping from C to P. This means that the cost of materialising results for N is never higher than the cost of materialising results for C. This is a worst-case scenario, for the most common cases the cost of materialising results for N will be be close to the cost of materialising results for P. However, without the introduction of N, we would have to materialise results not only for P, but also for G and all higher-level categories. Thus, the potential savings in materialisation costs are very high indeed.

Considering correctness, the mappings in the hierarchy should be strict upon termination, and the algorithm should only make transformations that are semantically correct. More specifically, it is acceptable that some mappings be non-strict, namely the ones from the new, fused categories to the unsafe parent categories. This is so because unsafe categories do not have predecessors in the resulting hierarchy, meaning that aggregate results for these categories will not be re-used.

The correctness follows from Theorems 5 and 6, below. When evaluating queries we get the same result for original values as when evaluating on the old hierarchy. The values that are deleted by the algorithm were not linked to any facts, meaning that these values did not contribute to the results in the original hierarchy. As all the new values are inserted into new categories that are unknown to the user, the aggregate result obtained will be the same for the original and transformed hierarchy. Thus, we do not need to modify the original query.

Theorem 5 Let D' be the dimension resulting from applying algorithm MakeStrict on dimension D. Then the following hold: Algorithm MakeStrict terminates and the hierarchy for the dimension D'', obtained by removing unsafe categories from D', is strict.

Proof: By induction in the height of the dimension lattice. Base: The height is 0, making the statement trivially true. Induction Step: Assuming that the statement is true for lattices of height n, lattices of height n+1 are considered. All steps in the algorithm terminate, and the algorithm is called recursively on either P (in the strict case) or N (in the non-strict case), both of which are the root of a lattice of height n, thus guaranteeing termination.

For the strictness property, there are three cases. If the mapping from C to P is already strict, this mapping is not changed, and by the induction hypothesis, the statement holds for the recursive call on P. If the mapping from C to P is non-strict, but P does not have any parents, strictness is ensured, as P is excluded from D''. If the mapping is non-strict and P has parents, the resulting mapping from C to N is strict. By the induction hypothesis, the statement holds true for the recursive call on N, as the introduction of N has not increased the height of the lattice.

Theorem 6 Given dimensions D and D' such that D' is the result of applying algorithm MakeStrict to D, an aggregate obtained using D' is the same as that obtained using D.

Proof: Follows from Lemma 2, as all facts are mapped to values in the ⊥ category, which is a safe category. Thus, there will be a path from a fact f to an original dimension value e iff there was one in the original hierarchy, meaning that aggregate results computed using the original and the new hierarchy will be same.

Lemma 2 For the dimension $D'=(C', \leq')$ resulting from applying algorithm MakeStrict to dimension $D=(C, \leq)$, the following holds. $\forall e_1, e_2 \in D(e_1 \in C_1 \wedge Safe(C_1) \wedge e_1 \leq' e_2 \Leftrightarrow e_1 \leq e_2)$ (there is a path between an original dimension value in a safe category and any other original dimension value in the new dimension hierarchy iff there was a path between them in the original hierarchy).

Proof: By induction in the height of the dimension lattice. Base: The height of the lattice is 0, making the statement trivially true. Induction Step: If either the mapping from C to P is strict, or P does not have any parents, the algorithm does not change the mappings, and by the indiction hypothesis, the statement is true for the recursive call on P. Otherwise, we observe that the creation of fused values in N, and the linking of C, P, and G values to these, only links exactly the values in C and P, or C and G, that were linked before. Because P is not safe, the links from P to G may be deleted. By the induction hypothesis, the statement is true for the recursive call on N.

In the method described above, both the original and the new categories are kept in the same hierarchy. An alternative would be to keep the "unsafe" categories and the mappings to them in a separate hierarchy, so that only "safe" categories are kept in the main hierarchy.

Fact-Dimension Transformation Techniques

This section explains how the set of algorithms from the section "Dimension Transformation Techniques" may also be applied to the relationships between facts and dimensions, thus providing a basis for enabling practical pre-aggregation on concrete MOs that include fact data.

The basic idea is to view the set of facts F as the bottom granularity in the lattice. The input to the algorithms then consists of the facts, F, the $R_{F,C}$ tables, describing the mappings from facts to dimension values, and the C and $R_{C_1,C_2}$ tables, describing the dimension categories and the mappings between them.

Only the covering and strictness properties are considered because for the fact-dimension relationships, a mapping between facts and dimension values that is into means that not all dimension values in the bottom category have associated facts, which does not affect summarisability. As before, we first apply the MakeCovering algorithm, then the MakeStrict algorithm.

The computational complexity of the algorithms will now be dominated by the size, n, of the mapping between facts and dimension values, i.e., the complexity will be O(n log n) if we assume the height of the lattice and the maximum number of values fused together to be small constants. This means that the algorithms can be applied to even very large databases.

Mixed Granularity Mappings

The first case to consider is the one where some of the mappings are non-covering w.r.t. the facts, meaning that not all facts can be reached through these mappings and thus resulting in these facts not being accounted for in aggregate computations. This occurs when some facts are mapped directly to dimension values in categories higher than the ⊥ category, i.e., the facts are mapped to values of mixed granularities.

We use the MakeCovering algorithm to make the mappings covering, initially calling it on F, which is now the bottom of the lattice. The algorithm makes the mappings covering w.r.t. the facts by inserting new marked values, representing the parent values, in the intermediate categories, and by linking the facts to the new values instead of the parent values. As in the section "Non-Covering Hierarchies," the marked values keep information about their original values, so that when new fact-dimension mappings are added, the links that are supposed to go directly to the original parent values now instead can be set to go to the marked value in the ⊥ category.

EXAMPLE 9

In the case study, the mapping between Patients and Diagnoses is of mixed granularity: "John Doe" (1) and "Jane Doe" are both mapped to the Diagnosis Family, "Insulin dependent diabetes" (9), "Jane Doe" is additionally mapped to the Low-level Diagnosis, "Insulin dependent diabetes during pregnancy" (5), and "Jim Doe" is mapped to "Diabetes" (11), a Diagnosis Group.

In the first call of the algorithm, two new Low-level Diagnoses are inserted "L9," representing "Insulin dependent diabetes," and "L11," representing "Diabetes"; and the facts are mapped to these instead of the original values. In the recursive call on Low-level Diagnosis, an "F11" value representing "Diabetes" at the Diagnosis Family level is inserted between "Diabetes" and value "L11."

Figure 5:
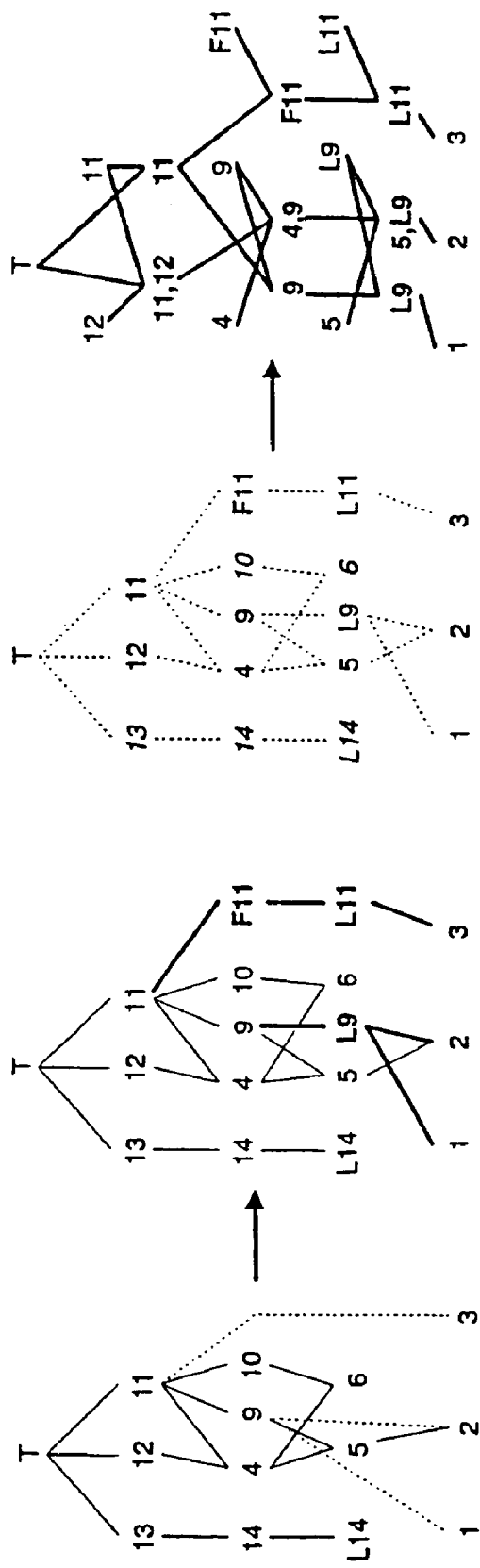
FIG. 5 illustrates on the left another example of the transformation performed by the Make Onto algorithm and on the right the transformation performed by the Make Strict algorithm executed thereafter.

The transformations are illustrated in FIG. 5, where dotted lines indicate links that are deleted by the algorithm and bold-face value and thick lines indicate dimension values and links inserted by the algorithm.

Many-To-Many Relationships

The second case occurs when relationships between facts and dimension values are many-to-many. This means that the hierarchy, with the facts as the bottom category, is non-strict, leading to possible double-counting of facts. It is enough to make the hierarchy partly strict, as described in the section "Non-Strict Hierarchies." The MakeStrict algorithm is initially called on F, which is now the bottom of the hierarchy lattice. Because the MakeCovering algorithm has already been applied, all paths from facts to the T value have equal length, as required by the MakeStrict algorithm.

Some dimension values have no facts mapped to them, leading to an interesting side effect of the algorithm. When the algorithm fuses values and places the fused values in-between the original values, it also deletes the child-to-parent and parent-to-grandparent links. The fact-less dimension values are then left disconnected from the rest of the hierarchy, with no links to other values.

These fact-less dimension values do not contribute to any aggregate computations and are thus superfluous. To minimise the dimensions, an "Delete-unconnected" algorithm that deletes the fact-less dimension values by traversing the hierarchy starting at the facts is invoked in a postprocessing step. For a hierarchy of height k, this can be done in time O(kn log n), where n is the size of the mapping between facts and dimensions. Thus, the overall computational complexity is not altered.

EXAMPLE 10

The relationship between patients and diagnoses is many-to-many. In Example 9, the MO was transformed so that all mappings were covering, as seen in FIG. 5, algorithm MakeStrict is applied to this MO. The final result of the application of the algorithm is seen in FIG. 5. Values in italics e.g. L14, and dotted lines indicate deleted values and links. Bold-face values and thick lines denote values and links inserted by the algorithm.

Three new categories are introduced: "Set-of Low-level Diagnosis" "Set-of Diagnosis Family," and "Set-of Diagnosis Group:" as non-strictness occurs at all levels. Fused values are inserted into these fused categories. For example, values "(low-level) Lung Cancer" (L14), "Insulin dependent diabetes during pregnancy, (low-level) Insulin dependent diabetes" (5, L9), and "(low-level) Insulin dependent diabetes" (L9) are inserted into the "Set-of Low-level Diagnosis" category; and the original values are linked to the new values.

Values "(low-level) Lung cancer" (L14), "Lung cancer" (14), "Cancer" (13), "Non-insulin dependent diabetes during pregnancy" (6), and "Non insulin dependent diabetes" (10) do not characterise any facts and are deleted by "Delete-unconnected."

Architectural Context

Overview

The overall idea presented in this paper is to take un-normalised MOs and transform them into normalised MOs that are well supported by the practical pre-aggregation techniques available in current OLAP systems. Queries are then evaluated on the transformed MOs. However, we still want the users to see only the original MOs, as they reflect the users' understanding of the domain. This prompts the need for means of handling both the original and the transformed MOs. This section explores this coexistence.

A current trend in commercial OLAP technology is the separation of the front-end presentation layer from the back-end database server. Modern OLAP applications consist of an OLAP client that handles the user interface and an OLAP server that manages the data and processes queries. The client communicates with the server using a standardised application programming interface (API), e.g., Microsoft's OLE DB for OLAP [17] or the OLAP Council's MDAPI [20]. The architecture of such a system is given to the left in FIG. 8.

Figure 6:
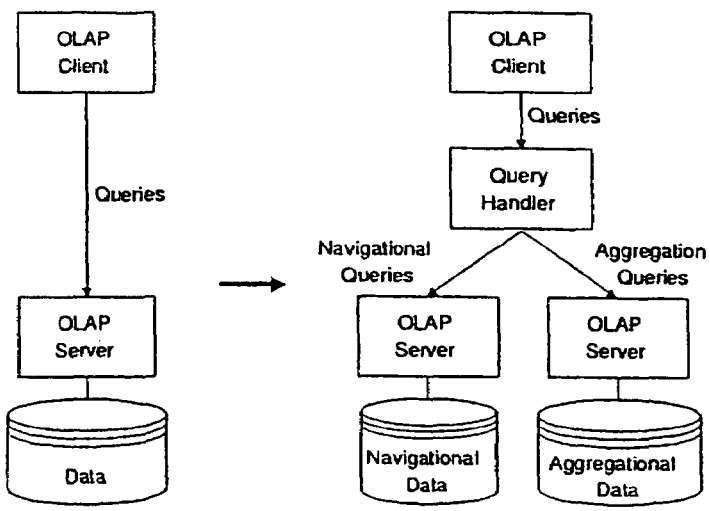
FIG. 6 shows on the left the architecture of a standard OLAP system and on the right the architecture of the present invention.

This separation of client and server facilitates our desire to have the user see the original MO while queries are evaluated against the transformed MO. Studies have shown that queries on a data warehouse consist of 80% navigational queries that explore the dimension hierarchies and 20% aggregation queries that summarise the data at various levels of detail [14]. Examples of navigational and aggregation queries are "Show me the Low-Level Diagnoses contained in the Insulin-Dependent Diabetes Diagnosis Family" and "Show me the count of patients, grouped by Diagnosis Family," respectively. The navigational queries must be performed on the original MO, while the aggregation queries must be performed on the transformed MO. This is achieved by introducing an extra "Query Handler" component between the client and the server. The OLAP client sends a query to the query handler, the primary task of which is to determine whether the query is a navigational query (internal to a dimension) or an aggregation query (involving the facts). Navigational queries are passed to one OLAP server that handles the original (navigational) data, while aggregation queries are passed to another OLAP server that manages the transformed (aggregation) data. This extended system architecture is seen to the right in FIG. 6.

The OLAP server for navigation data needs to support dimension hierarchies which have non-summarisable properties, a requirement not yet supported by many commercial systems today. However, relational OLAP systems using snow-fake schemas [14] are able to support this type of hierarchies, as are some other OLAP systems, e.g., Hyperion (Arbor) Ess-base [12]. If the OLAP system available does not have sufficiently flexible hierarchy support, one solution is to build a special-purpose OLAP server that conforms to the given API. This task is not as daunting as it may seem at first because only navigational queries need to be supported, meaning that multidimensional queries can be translated into simple SOL "lookup" queries.

We note that the only data needed to answer navigational queries is the hierarchy definitions. Thus, we only need to store the fact data (facts and fact-dimension relations, in our model) once, in the aggregational data, meaning that the overall storage requirement is only slightly larger than storing just the aggregational data. Navigational queries are evaluated on the original hierarchy definitions and do not need to be re-written by the query handler.

As described in the section "Dimension Transformation Techniques," aggregation queries need to be rewritten slightly by adding an extra HAVING clause condition to exclude results for the new values inserted by the transformation algorithms. This can easily be done automatically by the query handler, giving total transparency for the user. Even though the added HAVING clause conditions are only necessary for the covering and onto transformations, they can also be applied to hierarchies transformed to achieve strictness; this has no effect, but simplifies the query rewriting. The new values can also be filtered out using a modified WHERE clause, by performing an inner join with a table containing only the original values, or by using nested SELECT statements as described in the next section.

Concrete Implementation

We now show how the abstract architecture described above can be implemented using standard relational database technology.

Figure 7:
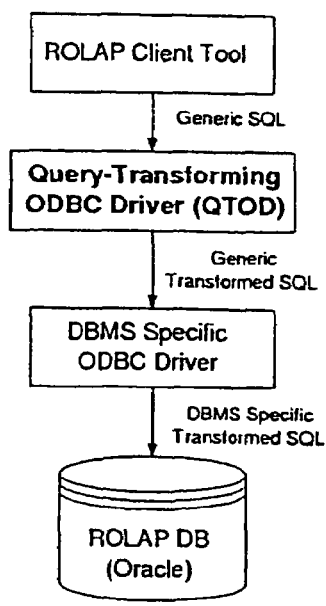
FIG. 7 shows the implementation of the system architecture.

The transparency is achieved by working with two versions of each user-specified hierarchy and by using a query rewrite mechanism. This is described in detail later in this section. The overall system architecture is seen in FIG. 7.

common to all RDBMSs, so Oracle8 may be replaced by another RDBMS such as IBM DB2, Informix, or MS SQL Server. Another ROLAP tool may also be used, making the solution quite general and flexible.

We have chosen to base the prototype on an RDBMS (Oracle8) since RDBMSs are the most commonly used platform for Data Warehouse and OLAP applications. Additionally, the major RDBMSs now, like dedicated multidimensional DBMSes (MDDBs), use pre-aggregated data for faster query responses [30]. However, the approach could also be implemented using multidimensional technology, e.g., based on the Microsoft OLE DB for OLAP standard [17].

The transformation algorithms are implemented in Oracle's PUSOL programming language. The transformations are relatively fast, taking at most a few minutes, even for large dimensions. Once the dimension hierarchies have been transformed, the QTOD transforms queries and results between the original and transformed hierarchies. The OTOD is a thin layer and adds very little overhead to queries. It is implemented using GNU Flex++/Bison++ scanner/parser generators and the MS Visual C++ compiler.

The two types of queries, navigation queries and aggregation queries, are treated differently to give the user the illusion that the dimension hierarchies have their original form.

The multidimensional data is captured in a star schema [14]. The dimension table for the Diagnosis dimension is given in Table 2, which has one column for the low-level diagnosis ID in addition to columns for the textual descriptions of low-level diagnoses, diagnosis families, and diagnosis groups.

The hierarchy captured in the table is partially normalised, i.e., placeholder values have been introduced to balance the hierarchy (but it remains non-strict). Specifically, the "!Lowlevel!Lung Cancer" placeholder value has been inserted into the Low-level Diagnosis level. We prefix such values with a "!" and their level to indicate that they are inserted by the transformation process. Note the multiple occurrences of lower-level values caused by the non-strictness of the hierarchy. This is the table that will be used for

TABLE 2

DDiagnosis Dimension Table

| DiagID | Lowlevel | Family | Group |
|---|---|---|---|
| 5 | Insulin dependent diabetes during pregnancy | Diabetes during pregnancy | Diabetes |
| 5 | Insulin dependent diabetes during pregnancy | Diabetes during pregnancy | Pregnancy related |
| 5 | Insulin dependent diabetes during pregnancy | Insulin dependent diabetes | Diabetes |
| 6 | Non insulin dependent diabetes during pregnancy | Diabetes during pregnancy | Diabetes |
| 6 | Non insulin dependent diabetes during pregnancy | Diabetes during pregnancy | Pregnancy related |
| 6 | Non insulin dependent diabetes during pregnancy | Non insulin dependent diabetes | Diabetes |
| 100 | !Lowlevel!fLung Cancer | Lung cancer | Cancer |

The ROLAP client tool, in this case the ROLAP tool Synchrony, which originated from Kimball's Startracker tool [14], makes SQL requests to the ROLAP database, in this case the Oracle8 RDBMS, using the ODBC standard. We have implemented a special, query-transforming ODBC driver (QTOD) that, based on case-specific metadata, transforms the SQL requests into requests that hide the transformations from the users, returning the query results that the user would expect based on the original hierarchies. A transformed request is submitted to the OLAP DB using an RDBMS-specific ODBC driver. The QTOD component is user navigation in the hierarchy. Its name is prefixed with a "D" to distinguish it from another "Diagnosis" dimension table (described below), to be used for aggregation queries.

We now describe how to achieve transformation transparency for navigational queries. The query below retrieves all low-level diagnosis names.

SELECT DISTINCT Lowlevel

FROM Diagnosis

Navigational queries issued by ROLAP tools have exactly this format. The query is transformed by the QTOD into the query seen next, which operates against the table DDiagnosis. The transformed query returns the result seen in Table 3.

SELECT DISTINCT Lowlevel

FROM DDiagnosis

WHERE Lowlevel NOT LIKE '!%'

TABLE 3

Navigational Query Result
Lowlevel

Insulin dependent diabetes during pregnancy
Non insulin dependent diabetes during pregnancy Due to the use of DISTINCT as a quantifier, duplicates are not returned. The NOT LIKE predicate removes the placeholder values inserted into the hierarchy to balance it, which in this case is the value "!Lowlevel!Lung Cancer." As desired, the result is unaffected by the translations.

For aggregation queries, it is also possible to achieve transformation transparency, although this is more difficult. For dimensions with non-strictness, a special dimension table is introduced that holds only the part of the normalised hierarchy that does not contain non-strictness. In the normalised hierarchy to the right in the left part of FIG. 4, this part is the Low-level Diagnosis category and the two special categories introduced by the normalisation process to hold sets of diagnosis families and sets of diagnosis groups, respectively. This part of the hierarchy is implemented in the Diagnosis dimension table seen in Table 4.

TABLE 4

Dimension and Group Tables for Aggregation

| DiagID | Lowlevel | Family | Group |
|---|---|---|---|
| 1000020 | !Low-level Diagnosis!Lung cancer | 14 | 13 |
| 5 | Insulin dependent diabetes during pregnancy | 4, 9 | 11, 12 |
| 6 | Non insulin dependent diabetes during pregnancy | 4, 10 | 11, 12 |

Diagnosis

| Group | SGroup |
|---|---|
| Cancer | 13 |
| Diabetes | 11, 12 |
| Pregnancy Related | 11, 12 |

S Group

Table 4: Dimension and Group Tables for Aggregation

The "Lowlevel" column contains the normal textual diagnosis description, whereas the special "Family" and "Group" columns contain comma-separated ordered lists of the IDs of the sets of values that are represented by the column values. For example, value "4, 9" represents the set {4, 9}.

We need to capture the remaining part of the hierarchy, which consists of non-strict mappings from a "set-of-X" category to the "X" category, e.g., the mapping of the "set-of-Diagnosis Group" category to the "Diagnosis Group" category to the right in FIG. 4, which maps {13} to 13 (Cancer) and {11, 12} to 11 (Diabetes) and 12 (Pregnancy Related). This is done by introducing a special table for each such mapping, named by the category prefixed with an "S" (for Set-of). For example, for the Diagnosis Group category, table "SGroup" in Table 4 maps sets of diagnosis groups to the individual diagnosis groups in the sets. The "Group" column represents the diagnosis group, while the "SGroup" column represents the associated set of diagnosis groups.

With these tables available, it is possible to obtain transformation transparency for aggregation queries. A ROLAP aggregation query has the format of the query below that computes the number of patients per diagnosis group.

SELECT Diagnosis.Group, SUM (Patient.Count)

FROM Diagnosis, Patient

WHERE Diagnosis.DiagID=Patient.DiagID

GROUP BY Diagnosis.Group

This is transformed into the more complex query given next.

SELECT SGroup.Group, SUM(QQQQQQQ.Count)

FROM Sgroup, (SELECT Diagnosis.Group,

SUM(Patient.Count) AS Count

FROM Diagnosis,Patient

WHERE Diagnosis.DiagID=Patient.DiagID

GROUP BY Diagnosis.Group) QQQQQQQ

WHERE   QQQQQQQ.Group=SGroup.SGroup   AND

SGroup.SGroup NOTUKE "!%"

GROUP BY SGroup-Sgroup

The transformed aggregation query has two parts. The nested table expression computes the number of patents per set of diagnosis group, making this available via correlation name QQQQQQQ. This part of the hierarchy is a balanced tree, so the RDBMS can safely use pre-aggregated data for optimising the query performance. The result of the nested table expression is used in the outer query, which aggregates the last part of the way up to the diagnosis groups using the "SGroup" table. The outer query also filters out any placeholder values inserted by the normalisation process (prefixed with a "!"). As a result, the client OLAP tool will retrieve the expected result.

Good query performance without the use of excessive storage for pre-aggregated data is obtained by using practical pre-aggregation for the "nice" part of the hierarchy captured in the "Diagnosis" dimension table. The query transformation exemplified here can be performed for all ROLAP aggregation queries, making the solution quite general.

Incremental Computation

When dimension hierarchies or fact data are updated, the transformed hierarchies must be updated correspondingly. One solution is to recompute the hierarchies using the new data. This straightforward solution is attractive when updating small dimension hierarchies that only change infrequently, or when large bulks of updates are processed. However, for massive hierarchies and frequent updates, and for updates of small parts of the hierarchies in general, it is desirable if the algorithms need only consider the changed parts of data, which will only be a small fraction of the total data volume. This section briefly describes how to incrementalise the algorithms.

In addition to modifying the transformed hierarchies, it is also necessary to update the actual pre-aggregated data when the underlying base data is modified. The modified hierarchies resulting from the algorithms given in this section differ only locally from the argument hierarchies. This means that the cost of updating the pre-aggregated data will not be greatly affected by the hierarchy transformations.

In the incremental algorithms, updates are modeled as deletions followed by insertions, so we consider only the latter two modification operations. We use prefix $\Delta_i$ to denote inserted values, $\Delta_d$ to denote deleted values, and $\Delta$ to denote all modifications. For example, $\Delta_i C$ denotes the values inserted into C. The category and links tables in the algorithms refer to the states after modifications; and when a hierarchy value is deleted, all links to that value are also assumed to be deleted in the same set of modifications.

Covering Hierarchies

Modifications may render covering hierarchies non-covering in several ways. The the left-most table in Table 5, named "Covering" and discussed next, indicates whether an insertion ("Insert") or a deletion ("Delete") on the different parts of the input to MakeCovering may render the modified hierarchy non-covering.

TABLE 5

Effects of Insertions and Deletions on the Covering, Onto, and Strictness Properties

| | Insert | Delete | | Insert | Delete | | Insert | Delete |
|---|---|---|---|---|---|---|---|---|
| C | yes | no | C | no | yes | C | no | yes |
| P | no | yes | P | yes | no | P | no | yes |
| H | no | yes | $R_{C,P}$ | no | yes | G | no | yes |
| $R_{C,H}$ | yes | no | | | | $R_{C,P}$ | yes | yes |
| $R_{C,P}$ | no | yes | | | | $R_{P,G}$ | yes | yes |
| $R_{P,H}$ | no | yes | | | | | | |
| | Covering | | | Onto | | | Strict | |

Problems may arise if links are inserted into $R_{C,H}$ that are not covered by insertions into $R_{C,P}$ and $R_{P,H}$, or if links are deleted in $R_{C,P}$ or $R_{P,H}$, but the corresponding C-to-H links are not deleted in $R_{C,H}$. If values are deleted in P or H, their links will be deleted too, which is handled by the case above. Values cannot be inserted into C without any links, as all values in the original hierarchy must at least be linked to the T value.

The incremental version of MakeCovering algorithm starts by finding (in line (6)) the links L from C to H that are not covered by the links from C to P and P to H. These links are used as the base for the rest of the transformation. Thus, line (6) of the algorithm becomes the following expression.

$$L \leftarrow \Delta_i R_{C,H} \cup \Pi_{C,H}(\Delta_d R_{C,P} \bowtie R_{P,H}) \cup \Pi_{C,H}(R_{C,P} \bowtie \Delta_d R_{P,H}) \setminus \Pi_{C,H}(\Delta_i R_{C,P} \bowtie \Delta_i R_{P,H}) \setminus \Delta_d R_{C,H}$$

Onto Hierarchies

The effects on the onto property of insertions and deletions are outlined in the middle table in Table 5. Insertion of values into P, deletion of values in C, and deletion of links in $R_{C,P}$ may cause the hierarchy to become non-onto. The incremental version of the MakeOnto algorithm thus starts by finding (in line (4)) the "childless" values N from P with no children in C. As a result, line (4) of the algorithm becomes the following expression.

$$N \leftarrow \Delta_i P \cup \Pi_P(\Delta_D R_{C,P}) \setminus \Pi_P(\Delta_d P) \setminus \Pi_P(\Delta_i R_{C,P})$$

Strict Hierarchies

The case of maintaining the strictness property of hierarchies is more complicated because a new category N is introduced by the algorithm. We assume that all new categories have already been created before the incremental algorithm is used, i.e., if non-strictness is introduced in new parts of the hierarchy, we have to recompute the transformed hierarchy. The introduction of non-strictness requires major restructuring of both the hierarchy and the pre-aggregated data, so this is reasonable.

An overview of the effect on strictness of insertions and deletions in the input to algorithm MakeStrict is given in the right-most table in Table 5. If links are inserted into, or deleted from, $R_{C,P}$ or $R_{P,G}$, the links to N for the affected C, P, and G values must be recomputed.

Insertions into, or deletion from, C, P, or G will be accompanied by corresponding link insertions and deletions, so they are handled by the above case. The incremental MakeStrict, given below, works by finding the affected C, P, and G values, then recomputes their links to N and deletes the old links, and finally inserting the new links. As before, it is followed by a step that deletes the disconnected parts of the hierarchy.

(1)   procedure IncrementalMakeStrict(C)
(2)     for each P ∈ Pred(C) such that Pred(P) ≠ 0 do
(3)     begin
(4)       $dC \leftarrow \Pi_C(\Delta R_{C,P})$
(5)       $dR_{C,N} \leftarrow \{(c, \text{Fuse}(\{p \mid (c,p) \in dC \bowtie R_{C,P}\}))\}$
(6)       $dN \leftarrow \Pi_N(d_{R_{C,N}})$
(7)       $N \leftarrow N \cup dN$
(8)       $R_{C,N} \leftarrow R_{C,N} \setminus \{(c,n) \mid c \in dC\} \cup dR_{C,N}$
(9)       $dP \leftarrow \Pi_P(\Delta R_{C,P})$
(10)      $dR_{N,P} \leftarrow \{(n,p) \mid n \in dN \wedge p \in dP \cap \text{UnFuse}(n)\}$
(11)      $R_{N,P} \leftarrow R_{N,P} \setminus \{(n,p) \mid p \in dP\} \cup dR_{N,P}$
(12)      for each G ∈ Pred(P) do
(13)      begin
(14)         $dG \leftarrow \Pi_G(\Delta R_{P,G} \cup (dP \bowtie R_{P,G}))$
(15)         $R_{N,G} \leftarrow R_{N,G} \setminus \{(n,g) \mid g \in dG\} \cup \Pi_{N,G}(R_{N,P} \bowtie R_{P,G} \bowtie dG)$
(16)      end
(17)      IncrementalMakeStrict(N)
(18)     end
(19)   end

REFERENCES

[1] E. Baralis, S. Paraboschi, and E. Teniente. Materialized View Selection in a Multidimensional Database. In *Proceedings of the Twenty-Third International Conference on Very Large Data Bases*, pp. 156–165, 1997.

[2] E. F Codd. Providing OLAP (on-line analytical processing) to user-analysts: An IT mandate. *Technical report, E. F Codd and Associates*, 1993.

[3] S. Dar, H. V. Jagadish, A. Y. Levy, and D. Srivastava. Answering SQL Queries Using Views. In *Proceedings of the Twenty-Second International Conference on Very Large Data Bases*, pp. 318–329, 1996.

[4] R M. Deshpande, J. F. Naughton, K. Ramasamy, A. Shukla, K. Tufte, and Y. Zhao. Cubing Algorithms, Storage Estimation, and Storage and Processing Alternatives for OLAP. *IEEE Data Engineering Bulletin*, 20(1):3–11, 1997.

[5] C. E. Dyreson. Information Retrieval from an Incomplete Data Cube. In *Proceedings of the Twenty-Second Conference on Very Large Databases*, pp. 532–543, 1996.

[6] J. Gray, S. Chaudhuri, A. Bosworth, A. Layman, D. Reichart, M. Venkatrao, F. Pellow, and H. Pirahesh. Data Cube: A Relational Aggregation Operator Generalizing Group-By, Cross-Tab and Sub-Totals. *Data Mining and Knowledge Discovery*, 1 (1):29–54, 1997.

[7] A. Gupta, V. Harinarayan, and D. Quass. Aggregate Query Processing in Data Warehousing Environments. In

*Proceedings of the Twenty-First International Conference on Very Large Data Bases*, pp. 358–369, 1995.

[8] H. Gupta, V. Harinarayan, A. Rajaraman, and J. Ullman. Index Selection for OLAP. In *Proceedings of he Thirteenth International Conference on Data Engineering, pp. 208–219*, 1997.

[9] H. Gupta. Selection of Views to Materialize in a Data Warehouse. In *Proceedings of the Sixth International Conference on Database Theory*, pp. 98–112, 1997.

[10] H. Gupta and I. S. Mumick. Selection of Views to Materialize Under a Maintenance-Time Constraint. In *Proceedings of the Seventh International Conference on Database Theory*, pp. 453–470, 1999.

[11] V. Harinarayan, A. Rajaraman, and J. D. Ullman. Implementing Data Cubes Efficiently. In *Proceedings of the ACM SIGMOD International Conference on the Management of Data*, pp. 205–216, 1996.

[12] Hyperion Corporation. Hyperion Essbase OLAP Server. URL: <www.hyperion.com/downloads/essbaseolap.pdf>. Current as of Feb. 17, 1999.

[13] Informix Corporation. Data Warehouse Administrator's Guide: MetaCube RO-LAP Option for Informix Dynamic Server. URL: <www.informix.com/answers/english/pdf_docs/metacube/4189.pdf>. Current as of Feb. 15, 1999.

[14] R. Kimball. *The Data Warehouse Toolkit*. Wiley Computer Publishing, 1996.

[15] R. Kimball. Data Warehouse Architect: Help with Multi-Valued Dimension. *DBMS Magazine*, 11(9), 1998.

[16] H. Lenz and A. Shoshani. Summarizability in OLAP and Statistical Data Bases. In *Proceedings of the Ninth International Conference on Statistical and Scientific Database Management*, pp. 39–48, 1997.

[17] Microsoft Corporation. OLE DB for OLAP Version 1.0 Specification. Microsoft Technical Document, 1998.

[18] Microsoft Corporation. OLAP Services White Paper. URL: <www.microsoft.com/sql/70/whpprs/olapoverview.htm>. Current as of Feb. 9, 1999.

[19] I. S. Mumick, D. Quass, and B. S. Mumick. Maintenance of data cubes and summary tables in a warehouse. In *Proceedings of the ACM SIGMOD International Conference on the Management of Data*, pp. 100–111, 1997.

[20] The OLAP Council. *MDAPI Specification Version 2.0*. OLAP Council Technical Document, 1998.

[21] The OLAP Report. *Database Explosion*. URL: <www.olapreport.com/Database-Explosion.htm>. Current as of Feb. 10, 1999.

[22] T. B. Pedersen and C. S. Jensen. Multidimensional Data Modeling for Complex Data. In *Proceedings of the Fifteenth International Conference on Data Engineering*, 1999. Extended version available as TimeCenter Technical Report TR-37, URL: <www.cs.auc.dk/TimeCenter>, 1998.

[23] T. B. Pedersen, C. S. Jensen, and C. E. Dyreson. Extending Practical Pre-Aggregation in On-Line Analytical Processing. In *Proc. VLDB*, pp. 663–674, 1999. Extended version available as TR R-99–5004, Dept. of Comp. Sci. Aalborg University, <www.cs.auc.dk/~tbp/articles/R995004.ps>, 1999.

[24] D. Quass and J. Widom. On-Line Warehouse View Maintenance for Batch Updates. In *Proceedings of the ACM SIGMOD International Conference on the Management of Data*, pp. 393–404, 1997.

[25] M. Rafanelli and A. Shoshani. STORM: A Statistical Object Representation Model. In *Proceedings of the Fifth International Conference on Statistical and Scientific Database Management*, pp. 14–29, 1990.

[26] A. Segev and J. L. Zhao. Selective View Materialization in Data Warehousing Systems. Working paper, URL: <ftp://segev.lbl.gov/pub/LBL_DB_PUBLICATIONS/1997/aggregdw.ps>. Current as of Feb. 9, 1999.

[27] A. Shukla, P. M. Deshpande, J. F. Naughton, and K. Ramasamy. Storage Estimation for Multidimensional Aggregates in the Presence of Hierarchies. In *Proceedings of the Twenty-Second International Conference on Very Large Data Bases*, pp. 522–531, 1996.

[28] D. Theodoratos and T. Sellis. Data Warehouse Configuration. In *Proceedings of the Twenty-Third International Conference on Very Large Data Bases*, pp. 126–135, 1997.

[29] J. Widom. Research Problems in Data Warehousing. In *Proceedings of the Fourth International Conference on Information and Knowledge Management*, pp. 25–30, 1995.

[30] R. Winter. Databases: Back in the OLAP game. *Intelligent Enterprise Magazine*, 1 (4):60–64, 1998.

[31] World Health Organization. *International Classification of Diseases* (ICD-10). Tenth Revision, 1992.

[32] J. Yang, K. Karlapalem, and Q. Li. Algorithms for materialized view design in a data warehousing environment. In *Proceedings of the Twenty-Third International Conference on Very Large Data Bases*, pp. 136–145, 1997.

The invention claimed is:

1. A method for transforming a general on-line analytical processing dimension into an at least partly aggregation normalised dimension, by means of a computer, the dimension having dimension values organised into categories of dimension values based on a partial ordering, the dimension comprising mappings of links between dimension values, the method comprising the steps of retrieve the mapping from data storage means associated with the computer, analysing the mapping to determine irregularities of the dimension, by means of analysing means executed by the computer, creating new dimension values of the dimension and modifying the mapping between dimensional values of the dimension according to the analysis, whereby the dimension is at least partly aggregation normalised, and saving the new dimension values and the modified mappings in data storage means of the computer, wherein the step of creating new dimensional values of the dimension and modifying the mapping comprises the steps of examine whether the dimension is covering, as well as onto, and executing a make-strict procedure for making the dimension aggregation strict if the dimension is covering as well as onto, thereby making the dimension aggregation normalised.

2. A method for transforming a general on-line analytical processing dimension into an at least partly aggregation normalised dimension, by means of a computer, the dimension having dimension values organised into categories of dimension values based on a partial ordering, the dimension comprising mappings of links between dimension values, the method comprising the steps of retrieve the mapping from data storage means associated with the computer, analysing the mapping to determine irregularities of the dimension, by means of analysing means executed by the computer, creating new dimension values of the dimension and modifying the mapping between dimensional values of the dimension according to the analysis, whereby the dimension is at least partly aggregation normalised, saving the new dimension values and the modified mappings in data storage means of the computer, wherein the step of creating new dimensional values of the dimension and modifying the mapping comprises the steps of examine whether the dimension is covering, and executing a make-onto procedure for making the dimension onto if the dimension is covering, thereby at least partly making an non-onto dimension aggregation normalised.

3. A method for transforming a general on-line analytical processing dimension into an at least partly aggregation normalised dimension, by means of a computer, the dimension having dimension values organised into categories of dimension values based on a partial ordering, the dimension comprising mappings of links between dimension values, the method comprising the steps of retrieve the mapping from data storage means associated with the computer, analysing the mapping to determine irregularities of the dimension, by means of analysing means executed by the computer, creating new dimension values of the dimension and modifying the mapping between dimensional values of the dimension according to the analysis, whereby the dimension is at least partly aggregation normalised, saving the new dimension values and the modified mappings in data storage means of the computer, wherein the step of creating new dimensional values of the dimension and modifying the mapping comprises the step of executing a make-covering procedure for making the dimension covering, thereby at least partly making a non-covering dimension aggregation normalised.

4. A method according to claim 1, wherein the make-strict procedure comprises the steps of, starting from the bottom category and successively proceeding towards the top category, identifying combinations of dimensional values of the same category for each of which combination at least one dimension value of a category below said category is linked to each of the dimension values of the combination, creating one or more new dimensional values each representing one of the identified combinations of dimensional values and creating links from the new dimensional values to dimensional values of above categories in accordance with existing links from each of the dimensional values represented by the new dimensional value, and identifying dimension values being linked to identified combinations of dimensional values of the same category and replacing the links with links to new dimensional values representing said combinations of dimensional values.

5. A method according to claim 1, wherein the make-strict procedure comprises the successive steps of (i) setting the bottom category of the dimension as the child category, (ii) for each category being a direct predecessor of the child category of which category at least one dimension value of the child category is linked to a dimension value of, setting said category as the parent category and performing the steps of:

(iia) ending the make-strict procedure for the parent category in case the parent category is the top category of the dimension, (iib) ending the make-strict procedure for the parent category in case no dimension value of the parent category is linked to a dimension value of a higher category, (iic) creating a new fused category in the dimension immediately below the parent category in case at least one of the dimension values of the child category is linked to more than one dimension value of the parent category, (iid) for each dimensional value of the child category, performing the steps of: creating a new dimension value of the new fused category representing the one or more values of the parent category to which the dimensional value of the child category is linked and creating links from said new dimension value to said values in the parent category, the creation of the new dimension value being conditioned that no dimension value of the new fused category already exists having exactly such link(s), and for each category being a direct predecessor of the parent category of which category at least one dimension value of the parent category is linked to a dimension value of, setting said category as a grandparent category and creating links from the new dimension value to the one or more dimension values of the grandparent category to which said one or more dimensional values of the parent category are linked, (iie) removing the links from the parent category to the one or more grandparent categories, whereby the grandparent categories no longer are direct predecessors of the parent category, (iif) creating links from each dimensional value of the child category to the dimension value of the new fused category having the same links to the dimension values of the parent category whereby the new fused category becomes a direct predecessor of the child category, and removing the links from the dimension values of the child category to the parent category, whereby the parent category no longer is a direct predecessor of the child category, and (iig) setting the new fused category as the child category and returning to step (ii).

6. A method according to claim 2, wherein the make-onto procedure comprises the steps of, starting from the top category and successively proceeding towards the bottom category, creating, for each dimension value of each category above the bottom category not being linked to any dimensional value of the category immediately below, a new dimension value in the category immediately below and creating a link between said new dimension value and said dimension value of the category in question.

7. A method according to claim 2, wherein the make-onto procedure comprises the successive steps of (i) setting the top category of the dimension as the parent category, (ii) for each category immediately below the parent category and having dimension values being linked to dimension values of the parent category, setting said category as the child category and perform the steps of (iia) creating, for each dimension value of the parent category not being linked to any dimensional value of the child category, a new dimension value in the child category and creating a link between said new dimension value and said dimension value of the parent category, (iib) setting the child category as parent category, (iic) ending the make-onto procedure in case the parent category is the bottom category of the dimension, else returning to step (ii) of the make-onto procedure.

8. A method according to claim 3, wherein the make-covering procedure comprises the successive steps of identifying links between dimension values of two categories having at least one intermediate category there between, creating a new dimension value in each of said intermediate categories for each of those links for which no paths of links exists going only through immediate child-parent links from lower to higher categories and including a link to a dimension value of the intermediate category, and replacing those links with links between the dimension values of those links and the new dimension values.

9. A method according to claim 3, wherein the make-covering procedure comprises the successive steps of (i) setting the bottom category of the dimension as the child category, (ii) for each category immediately above the child category for which at least one link between a dimension value of said category and a dimension value of the child category exists, setting the category as the parent category and perform the steps of, (iia) ending the make-covering procedure for the parent category in case the parent category is the top category of the dimension, (iib) for each higher category being a direct predecessor category of the child category and being higher in the hierarchy than the parent category, performing the steps of (iiba) identifying sets of dimension values of the higher category and dimension values of the child category for which sets a link exists, and no paths of links going only from lower to higher categories and including a link to a dimension value of the parent category exists, and (iibb) creating for each identified set of dimension values a new dimension value in the parent category, creating links between each of the dimension values of the set and the new dimension value, and removing the link between the two dimension values of the identified set, whereby the higher category no longer is a predecessor of the child category, (iic) setting the parent category as the child category and returning to step (ii).

10. A method for by means of a computer to at least partly aggregation normalise a multidimensional object including a set of facts comprising a plurality of facts mapped on a plurality of dimensions having dimension values organised into categories of dimension values based on a partial ordering, the multidimensional object comprising mappings of links between dimension values within each dimension, by means of applying the method of claim 1 to at least one of the dimensions of the multidimensional object.

11. A method according to claim 10, wherein the multidimensional object comprises a plurality of facts and the mapping comprises links from each of the facts to at least one dimension value in each of the plurality of dimensions, the facts constituting the bottom layer of each of the dimensions of the multidimensional object.

12. A method according to claim 10, comprising the steps of selecting a subset of categories of the one or more dimension to be aggregation normalised, and performing an aggregation normalisation of the selected subset, whereby one or more of the dimensions of the multidimensional object is/are only partly aggregation normalised.

13. A method according to claim 10, comprising the steps of selecting specific aggregation functions to be performed on the multidimensional object, and selecting by means of the computer normalisation steps to be performed based on the selection of specific aggregation functions to be performed, whereby one or more of the dimensions of the multidimensional object is/are only partly aggregation normalised.

14. A method for by means of a computer to at least partly aggregation normalise a general on-line analytical processing multidimensional object including a set of facts comprising a plurality of facts mapped on an aggregation normalised plurality of dimensions having dimension values being organised into categories of dimension values based on a partial ordering, the multidimensional object comprising mappings of links between dimension values within each dimension, the method comprising the steps of retrieve the mapping from data storage means associated with the computer, including the mapping of the plurality of facts on the multidimensional object into the mapping of the multidimensional object so that the mapping comprises links from each of the facts to at least one dimension value in each of the plurality of dimensions, and the facts constitute the bottom layer of each of the dimensions of the multidimensional object, analysing the mapping of the multidimensional object to determine irregularities of the dimensions by means of analysing means executed by the computer, creating new dimension values of the multidimensional object and modifying the mapping between dimensional values of the multidimensional object according to the analysis, whereby the multidimensional object is at least partly aggregation normalised, and saving the new dimensions and the modified mapping in data storage means of the computer, wherein the step of creating new dimension values of the multidimensional object and modifying the mapping comprises the step of executing a make-strict procedure for making the multidimensional object aggregation strict, thereby making the multidimensional object aggregation normalised, the make-strict procedure being executed on the condition that the multidimensional object is covering prior to the execution.

15. A method for by means of a computer to at least partly aggregation normalise a general on-line analytical processing multidimensional object including a set of facts comprising a plurality of facts mapped on an aggregation normalised plurality of dimensions having dimension values being organised into categories of dimension values based on a partial ordering, the multidimensional object comprising mappings of links between dimension values within each dimension, the method comprising the steps of retrieve the mapping from data storage means associated with the computer, including the mapping of the plurality of facts on the multidimensional object into the mapping of the multidimensional object so that the mapping comprises links from each of the facts to at least one dimension value in each of the plurality of dimensions, and the facts constitute the bottom layer of each of the dimensions of the multidimensional object, analysing the mapping of the multidimensional object to determine irregularities of the dimensions by means of analysing means executed by the computer, creating new dimension values of the multidimensional object and modifying the mapping between dimensional values of the multidimensional object according to the analysis, whereby the multidimensional object is at least partly aggregation normalised, and saving the new dimensions and the modified mapping in data storage means of the computer, wherein the step of creating new dimensional values of the multidimensional object and modifying the mapping comprises the step of executing a make-covering procedure for making the multidimensional object covering, thereby at least partly making the non-covering multidimensional object aggregation normalised.

16. A method according to claim 14, wherein the method comprises the initial step of making each of the plurality of dimensions aggregation normalised.

17. A method according to claim 10, wherein the created new dimensional values are marked as such, a pre-aggregation is performed on a multidimensional object being normalised by means of the computer and the method further comprises the step of producing a reply to a query made to the system and concerning the multidimensional object, aggregate queries, exploring the dimension hierarchies, as well as navigation queries, that summarise the data at various levels of detail, in which reply the existence of the created new dimensional values is transparent.

18. A method according to claim 10, further comprising the steps of implementing, into the aggregation normalised multidimensional object, of new facts including mapping of the facts onto the dimension, of new dimension values of the dimensions, or of new mapping between some of the dimension values, by which implementation irregularities of the multidimensional object is introduced, analysing the introduced irregularities of the dimensions of the multidimensional object, creating new dimensional values of the multidimensional object and modifying the mapping between dimensional values of the multidimensional object according to the analysis, whereby the multidimensional object is aggregation normalised, and saving the new dimensions and the modified mapping in data storage means of the computer.

19. A computer system comprising at least one general purpose computer having data storage means associated therewith on which data storage means is stored a computer programme product suitable for adapting the computer to perform an at least partly aggregation normalisation of a multidimensional object according to the method of claim 10, the computer system comprising means for retrieving the computer programme product and perform accordingly.

20. A computer programme product suitable for adapting a general purpose computer to perform an at least partly aggregation normalisation of a multidimensional object according to the method of claim 10.

21. A computer system for on-line analytical processing having data storage means associated therewith on which a multidimensional object is stored, the multidimensional object including a set of facts comprising a plurality of facts, a first plurality of dimensions having dimension values being organised into categories of dimension values based on a partial ordering and comprising a first mapping of links between dimension values within each dimension of the first plurality of dimensions as well as links between the facts and the dimensions of the first plurality of dimensions, at least one of the dimensions of the first plurality of dimensions being irregular, and a second plurality of dimensions having dimension values being organised into categories of dimension values based on a partial ordering and comprising a second mapping of links between dimension values within each dimension of the second plurality of dimensions as well as links between the facts and the dimensions of the second plurality of dimensions, each of the second plurality of dimensions being aggregation normalised, the computer system comprising a query handler component being adapted for producing replies to queries made to the computer system and concerning the multidimensional object, replies to navigation queries being based on the first set of dimensions and replies to aggregate queries being based on the second set of dimensions, wherein the query handler component is adapted for producing replies to aggregate queries in which replies the existence of the second plurality of dimensions is transparent, wherein the query handler component is adapted for transforming aggregate queries made to the first plurality of dimensions into queries for the second set of dimensions and transforming replies based on the second set of dimensions into replies as based on the first set of dimensions, thus making the existence of the second plurality of dimensions transparent in the produced reply, wherein the multidimensional object is stored within the data storage means of the computer system in tables organised as a combination of star schemes for the part of the multidimensional object containing only strict mappings, and additional tables containing the part of the mappings, the query handler component makes use of said tables in transforming queries and replies.

22. A computer system according to claim 21, wherein a set of pre-aggregation data relating to the second plurality of dimensions is stored within the data storage means and the replies to aggregate queries furthermore are based on the set of pre-aggregation data.

23. A computer system according to claim 21 further comprising means adapted for performing an at least partly aggregation normalisation of a multidimensional object.

* * * * *